US007065744B2

(12) United States Patent
Barker et al.

(10) Patent No.: US 7,065,744 B2
(45) Date of Patent: Jun. 20, 2006

(54) SYSTEM AND METHOD FOR CONVERTING MANAGEMENT MODELS TO SPECIFIC CONSOLE INTERFACES

(75) Inventors: Kevin S. Barker, Raleigh, NC (US); John E. Diller, Apex, NC (US); James L. Gay, Apex, NC (US); Margaret M. Hedstrom, Raleigh, NC (US); Carol J. Persche, Raleigh, NC (US); Mohamad R. Salahshoor, Raleigh, NC (US); John W. Sweitzer, Austin, TX (US); James Thorpe, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 10/047,792

(22) Filed: Jan. 14, 2002

(65) Prior Publication Data

US 2003/0135657 A1  Jul. 17, 2003

(51) Int. Cl.
*G06F 9/44*  (2006.01)

(52) U.S. Cl. ..................................... 717/109

(58) Field of Classification Search ........ 717/100–109, 717/113–117, 174–178, 144, 147, 136, 120; 707/1, 3, 10, 102, 103; 709/223–224, 216, 709/246; 705/1, 7, 64; 715/264, 835
See application file for complete search history.

(56) References Cited

U.S. PATENT DOCUMENTS

| 5,237,688 A | 8/1993 | Calvert et al. ............. 395/700 |
| 5,257,371 A | 10/1993 | Anezaki ................. 707/103 R |
| 5,317,742 A | 5/1994 | Bapat ......................... 395/700 |
| 5,483,631 A | 1/1996 | Nagai et al. ................. 715/736 |
| 5,566,294 A | 10/1996 | Kojima et al. .............. 715/866 |
| 5,635,918 A | 6/1997 | Tett ........................... 340/7.29 |

(Continued)

FOREIGN PATENT DOCUMENTS

JP  06168197 A  6/1994

OTHER PUBLICATIONS

Schmidt "Using Design Patterns to Develop Reusable Object-Oriented Communication Software" Oct. 1995 Communications of the ACM vol. 38, No. 10 pp. 65-74.

(Continued)

*Primary Examiner*—Kakali Chaki
*Assistant Examiner*—Tuan A. Vu
(74) *Attorney, Agent, or Firm*—VanLeeuwen & VanLeeuwen; Gerald R. Woods

(57) ABSTRACT

A system and method for converting management models to specific console interfaces is provided. A plug-in builder process is used to read a management definition object. The plug-in builder process derives display information and method information from the management definition object. Console interface information is used to take the management definition object and transform it into a format suitable for the selected consoles. The management definition object information includes information used to display tree nodes in a management console. The plug-in builder process retrieves methods from the management definition object that corresponds to the displayed nodes. In this manner, when a user selects a tree node from a management console, the method included in the management definition object that was written to support the displayed node is executed. National language files can be used by the plug-in builder process in order to support various national languages used by users.

28 Claims, 18 Drawing Sheets

U.S. PATENT DOCUMENTS

| | | | |
|---|---|---|---|
| 5,652,884 A | 7/1997 | Palevich | 395/651 |
| 5,754,173 A | 5/1998 | Hiura et al. | 715/744 |
| 5,829,053 A | 10/1998 | Smith et al. | 711/202 |
| 5,870,559 A | 2/1999 | Leshem et al. | 395/200.54 |
| 5,870,611 A | 2/1999 | London Shrader et al. | 717/175 |
| 5,872,966 A | 2/1999 | Burg | 395/651 |
| 5,907,696 A | 5/1999 | Stilwell et al. | 703/13 |
| 5,950,010 A | 9/1999 | Hesse et al. | 717/178 |
| 5,958,008 A | 9/1999 | Pogrebisky et al. | 709/223 |
| 5,970,490 A | 10/1999 | Morgenstern | 707/10 |
| 6,008,805 A | 12/1999 | Land et al. | 345/335 |
| 6,035,119 A | 3/2000 | Massena et al. | 395/701 |
| 6,085,196 A | 7/2000 | Motoyama et al. | 707/102 |
| 6,108,712 A | 8/2000 | Hayes, Jr. | 709/246 |
| 6,115,646 A | 9/2000 | Fiszman et al. | 700/181 |
| 6,118,446 A | 9/2000 | Jones et al. | 345/333 |
| 6,125,442 A | 9/2000 | Maves et al. | 712/220 |
| 6,134,559 A | 10/2000 | Brumme et al. | 707/103 |
| 6,144,962 A | 11/2000 | Weinberg et al. | 707/10 |
| 6,157,953 A | 12/2000 | Chang et al. | 709/225 |
| 6,161,126 A | 12/2000 | Wies et al. | 709/203 |
| 6,199,195 B1 | 3/2001 | Goodwin et al. | 717/104 |
| 6,252,593 B1 | 6/2001 | Gti | 345/781 |
| 6,311,321 B1* | 10/2001 | Agnihotri et al. | 717/120 |
| 6,317,748 B1* | 11/2001 | Menzies et al. | 707/103 X |
| 6,496,793 B1 | 12/2002 | Veditz et al. | 704/8 |
| 6,567,808 B1* | 5/2003 | Eschelbeck et al. | 707/10 |
| 6,708,074 B1 | 3/2004 | Chi et al. | 700/121 |
| 2002/0029263 A1 | 3/2002 | Toyoshima et al. | 709/223 |
| 2002/0069275 A1 | 6/2002 | Tindal | 709/223 |
| 2002/0091809 A1 | 7/2002 | Menzies et al. | 709/223 |
| 2002/0091819 A1* | 7/2002 | Melchione et al. | 709/224 |
| 2002/0103660 A1* | 8/2002 | Cramon et al. | 705/1 |
| 2002/0107872 A1 | 8/2002 | Hudis et al. | 707/104.1 |
| 2002/0140743 A1 | 10/2002 | DeLuca et al. | 345/835 |
| 2003/0018964 A1 | 1/2003 | Fox et al. | 717/177 |
| 2003/0055948 A1* | 3/2003 | Wang | 709/224 |
| 2003/0095142 A1 | 5/2003 | Patrizio et al. | 345/744 |
| 2003/0095145 A1* | 5/2003 | Patrizio et al. | 345/764 |
| 2003/0110073 A1 | 6/2003 | Briel et al. | 705/10 |
| 2003/0135648 A1 | 7/2003 | Porter | 709/246 |
| 2003/0177477 A1 | 9/2003 | Fuchs | 717/136 |
| 2004/0015889 A1 | 1/2004 | Todd et al. | 717/137 |

OTHER PUBLICATIONS

Keller et al. "A Pattern System for Network Management Interfaces" Sep. 1998 Communications of the ACM vol. 41 No. 9.

"Common Information Model (CIM) Specification ver 2.2." Jun. 14, 1999 DMTF.

"WBEM on Sun Developer's Guide," Aug. 1999, Sun Microsystems, Chapters 1, 2, and 4.

* cited by examiner

US 7,065,744 B2

SYSTEM AND METHOD FOR CONVERTING MANAGEMENT MODELS TO SPECIFIC CONSOLE INTERFACES

RELATED APPLICATIONS

This application is related to the following co-pending U.S. Patent Applications filed on the same day as the present application: "System and Method for Mapping Management Objects to Console Neutral User Interface," by Barker, Diller, Gay, Hedstrom, Persche, Salahshoor, and Thorpe (application Ser. No. 10/046,940); "System and Method for Managing Translatable Strings Displayed on Console Interfaces," by Barker, Diller, Hedstrom, Persche, Salahshoor, and Thorpe (application Ser. No. 10/047,793); "System and Method for Obtaining Display Names from Management Models," by Barker, Diller, Hedstrom, Persche, Salahshoor, and Thorpe (application Ser. No. 10/047,784); and "System and Method for Packaging and Installing Management Models with Specific Console Interfaces," by Barker, Diller, Hedstrom, Persche, Salahshoor, and Thorpe (application Ser. No. 10/047,312). The present application and each of the related applications have been assigned to the IBM Corporation.

BACKGROUND

1. Field of the Invention

The present invention relates to a system and method for providing interfaces between management models and system consoles. More particularly, the present invention relates to a system and method for creating interface files to link a generic management model to one or more specific console interfaces.

2. Description of the Related Art

There is an industry trend toward using standardized software engineering tools and techniques to represent the design of systems to manage real world objects. One such approach is using the Unified Modeling Language (UML) and a derivative of UML called the Common Information Model (CIM). Using UML and CIM, developers can describe a computer information system that is not bound to a particular implementation or platform. CIM includes both a CIM Specification and a CIM Schema and UML is generally used to show the structure of the schemas.

The CIM Specification includes a language model, naming conventions, meta schema, and mapping techniques used to map the CIM data to other management models including SNMP, MIBs, DMTF, and MIFs. The CIM Schema includes a set of classes with associations that provide a well understood conceptual framework within which it is possible to organize the available information about the managed environment.

The CIM Schema includes three layers. First, the Core Schema includes an information model that captures notions that are applicable to all areas of management. Second, the Common Schema includes notions that are common to particular management areas but independent of a particular technology or implementation. There are generally five Common Schema areas: (1) systems, (2) applications, (3) networks, (4) devices, and (5) physical areas. The third CIM Schema layer is the Extension Schema area which includes technology specific extensions of the Common Schema. The Extension Schema area may be specific to a particular operating environment, such as a UNIX operating environment. The Extension Schema may further describe either a specific-general type of environment (i.e., an MS-Windows™ environment, a UNIX-90 environment, etc.), or a product specific operating environment (i.e., Windows 2000 Professional™, IBM AIX version 3.5, etc.).

While CIM includes notations and conventions that are widely agreed upon in industry, a CIM model does not provide information for product development because a CIM model is implementation independent, meaning that a common CIM model can be used as a design starting point to develop systems in a particular operating environment. A CIM model may be stored in a Managed Object Format (MOF) file, which is an ASCII file that includes a formal definition of the CIM Schema. The MOF is used as input to a MOF editor, parser, and compiler. CIM is produced by designers and developers to model a product. The CIM model is then used by others as input to management systems. However, the process of using a CIM model as input to management software is a resource intensive task. A challenge, therefore, with the prior art is the time and resources needed to design a system using CIM and write programs directed towards a particular operating environment.

Management consoles, such as the Microsoft Management Console (MMC), the AS/400 System Console, the Tivoli Console, and WebSM™, allow common applications from which a user views and manipulates data associated with a software program or device that is accessible by the console. Another challenge in the current art is that a CIM model that models a computer information system is generally unable to interface with a management console without writing separate programs that implement the computer information system and interface with one or more of the available management consoles. What is needed, therefore, is a system and method that allows developers to describe a system once in a model (such as a CIM model) and provides interfaces from the model to one or more management consoles without the need of additional programming.

SUMMARY

It has been discovered that a framework for supporting multiple consoles addresses the aforementioned challenges. A plug-in builder process is used to read a management definition object, such as a CIM MOF file. The plug-in builder process derives display information and method information from the management definition object. The developer can specify one or more management consoles, such as the Microsoft Management Console (MMC), the Tivoli Console by IBM, the AS/400 system console, and the AIX™ system console (WebSM™) The plug-in builder process includes information about management consoles, such as console interface information. This interface information is used to take the management definition object and transform it into a format suitable for the selected console(s).

The plug-in information is sent to customers for use with the customer's system. The customer can select from a list of available consoles that the customer wishes to use to manage a product corresponding to the management definition object. For example, one customer may choose to install the MMC plug-in files because he uses the Microsoft Management Console, while another customer may install the Tivoli Console plug in files for use by the Tivoli Console by IBM. In this manner, customers can use a preferred console.

The management definition object information includes information used to display tree nodes in a management console. The plug-in builder process also retrieves methods from the management definition object that corresponds to the displayed nodes. In this manner, when a user selects a tree node from a management console, the method included in the management definition object that was written to support the displayed node is executed.

In addition, national language files can be used by the plug-in builder process in order to support various national languages used by users. Display information is extracted from the management definition object and placed in translation template files. Manual and automated processes are performed on the translation template files translating the extracted display information into one or more national languages. The national language information is provided to the customer along with the console plug-in information so that the customer can choose a preferred national language to use along with a preferred management console.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
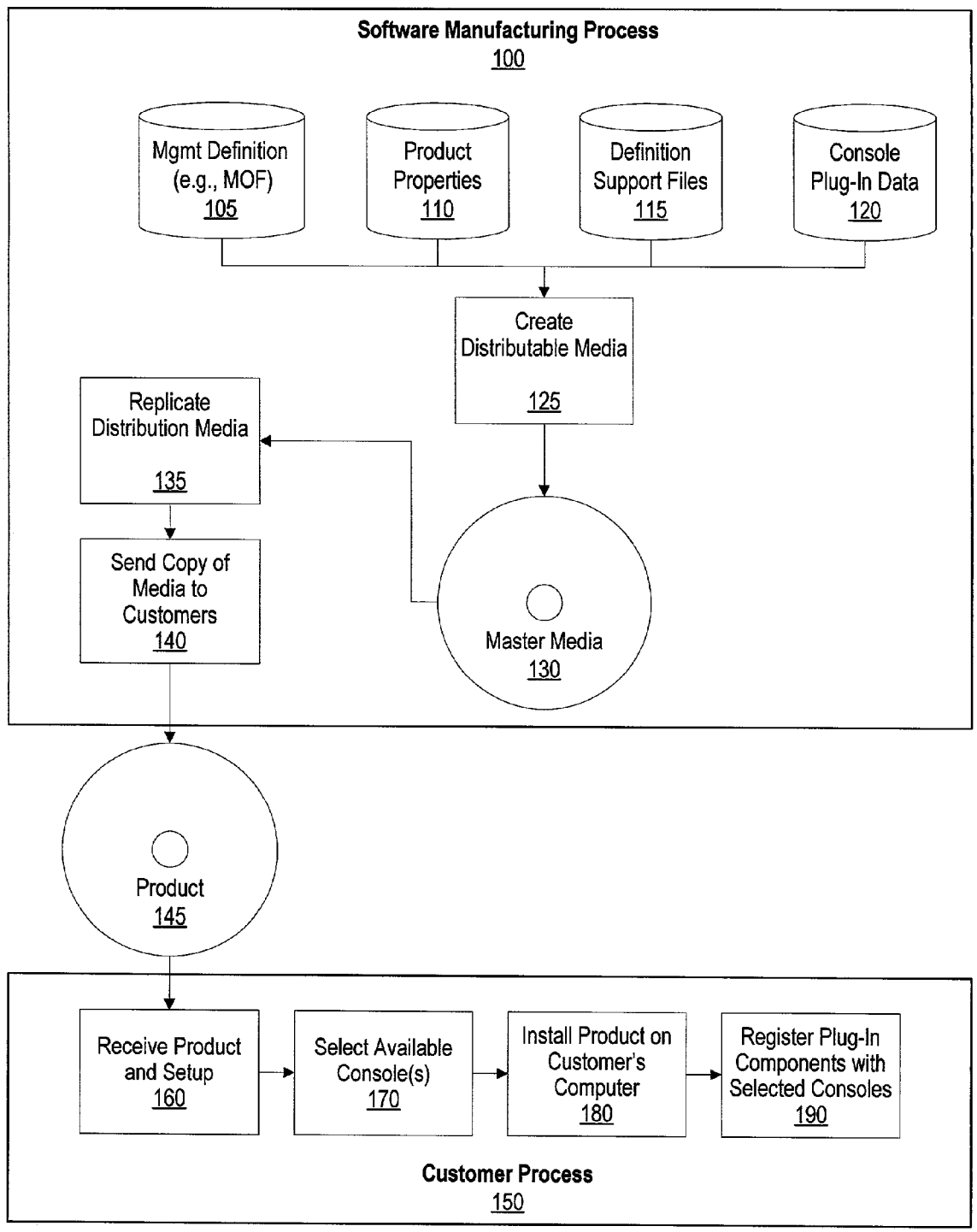
FIG. 1 is high level diagram of the overall process of providing console plug in files to customers.

FIG. 1 is high level diagram of the overall process of providing console plug in files to customers. Software manufacturing process 100 creates distributable media that is sent to customers for installation. Management definition object 105 (e.g., a MOF file) includes a management model, such as a CIM model that the software manufacturer wishes to distribute. The MOF file is used as input to the process. While a MOF file is shown, it will be understood by those skilled in the art that other types of input streams that model a system could also be used as input. Before distributing the management system, the software manufacturer establishes product properties 110, which includes a list of the management system consoles that will be supported by the software manufacturer. Product properties 110 may also include other options that are used when creating distributable media, such as a root object, a unique product identifier (in order to create names unique for each product), and location of the MOF file that will be used.

Definition support files 115 include other files, such as national language support (NLS) files and graphical user interface displays that are external to MOF 105 yet used to create the distributable media. Console plug in data 120 includes information about specific management system consoles. This data is used to create an interface, or plug-in, between the distributable media and one or more management system consoles (management system consoles are products such as Microsoft Management Console (MMC), the Tivoli Console by IBM, the AS/400 system console, and the AIX™ system console (WebSM™)). Extension files, as used herein, include the plug-in files which are asapted to interface with a particular console interface. Extension files are asapted to perform a generic management object on a selected console interface.

Figure 2:
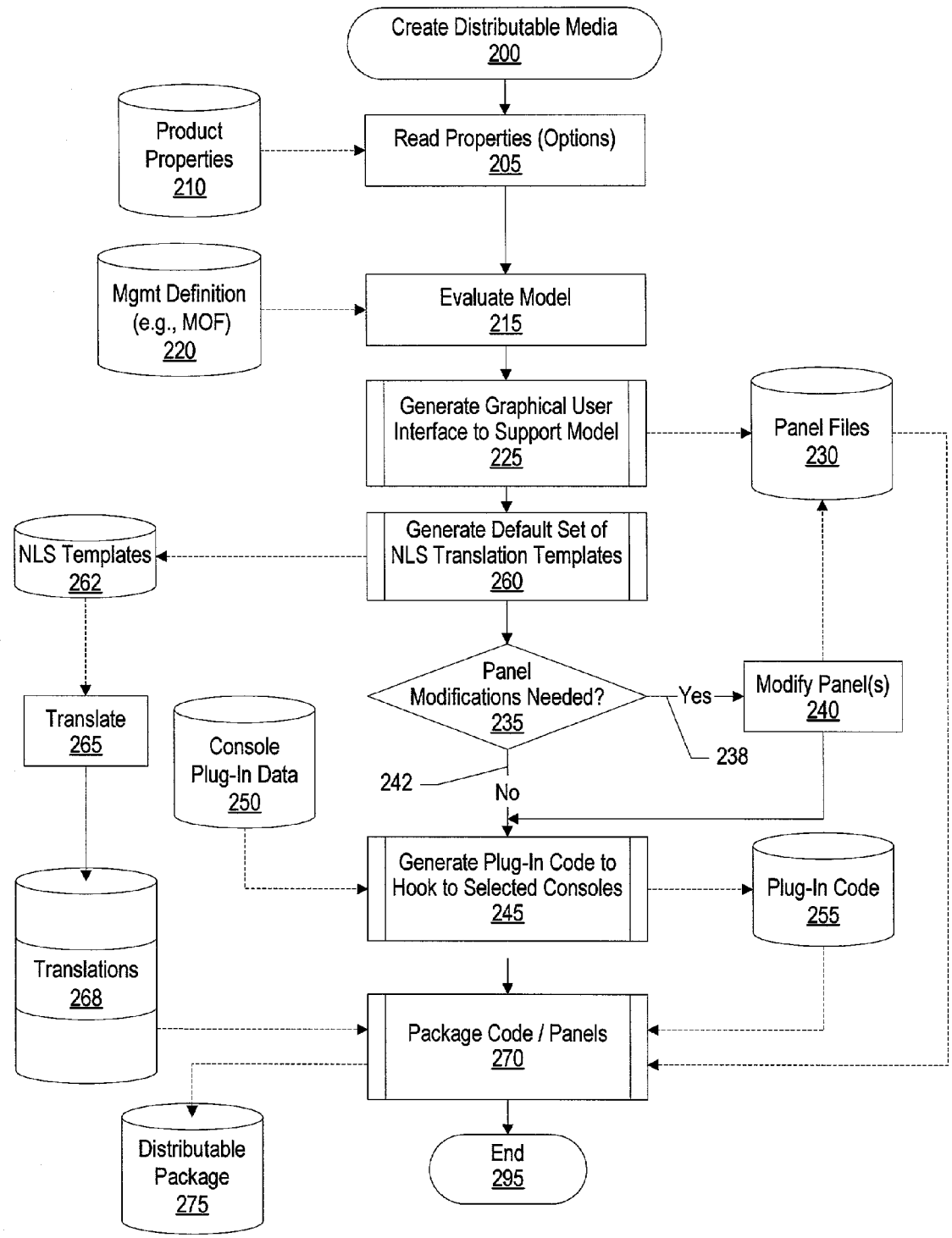
FIG. 2 is a high level flowchart showing the overall process of creating distributable media including console plug in files based upon a management definition.

Create distributable media 125 is a process that uses management definition object 105, product properties 110, definition support files 115, and console plug-in data 120 to create distributable media (for details regarding create distributable media process 125 see FIG. 2). The result of create distributable media process 125 is master media 130. Master media 130 is stored on a nonvolatile storage device, such as a hard drive, CD-R/RW, optical or magnetic storage, or nonvolatile memory. Replicate distribution media 135 is a process that replicates master media 130. The replication may be onto another nonvolatile storage device, such as a CD-R/RW or other removable media, or the replication can be made into a data stream for transmitting to a customer. Send copy of media to customers 140 is a process that sends a replicated copy of the distribution media resulting from process 135 to the customer. If a tangible, removable media is created, send process 140 may physically package the removable media and send product media 145 to the customer through the mail or other parcel service. On the other hand, if the media is a data stream, then send process 140 transmits the data stream that includes the product to the customer through a computer network, such as the Internet, or using a modem that connects the software manufacturer's computer system to the customer's computer system.

Customer process 150 commences with the customer receiving the product and running a setup program included with the product (step 160). The receipt may be a tangible receipt of a removable nonvolatile storage device, such as a CD-R/RW disc, that is placed in a customer device, such as a CD-ROM drive, in order to install the product. The receipt may also be by the receipt of a data stream over a computer network or modem connection through which the product data is stored on the customer's nonvolatile storage device, such as a hard drive or nonvolatile memory accessible by the customer's computer system.

Executing the setup program included with the product allows the customer to select from one or more available consoles (step 170). The number of consoles the customer selects depends upon (i) the number of consoles for which the software manufacturer enabled the product to interface (defined by product properties 110 and console plug-in data 120), and (ii) the number of consoles that the customer uses or plans to use. For example, if the software manufacturer enabled the product to be used with four consoles, those four consoles would be selectable by the customer. If the customer has a particular console of choice, such as the Tivoli console, then he selects his preferred console and does not install plug-in files associated with the other consoles. The selected console plug-in(s) are installed on the customer's computer system (step 180, see FIG. 6 for further customer installation details). The installed plug-in components are registered with the applicable consoles (step 190) so that the consoles recognize the installed plug-in components and the installed product when used by the customer.

FIG. 2 is a high level flowchart showing the overall process of creating distributable media including console plug in files based upon a management definition. Processing commences at 200 whereupon the properties are read (step 205) from product properties data store 210. Management definition object 220, such as a MOF, is read and evaluated (step 215) to determine the panels, plug-in code, and NLS data needed to process. A graphical user interface is generated to support the model (predefined process 225, see FIGS. 8 and 9 for further processing details). The generated user interface panels are stored in panel files data store 230. In one embodiment, the panel files are created as Java and/or Extensible Markup Language (XML) files capable of being rendered with browser software such as Microsoft Internet Explorer™ or Netscape Navigator™.

Figure 14:
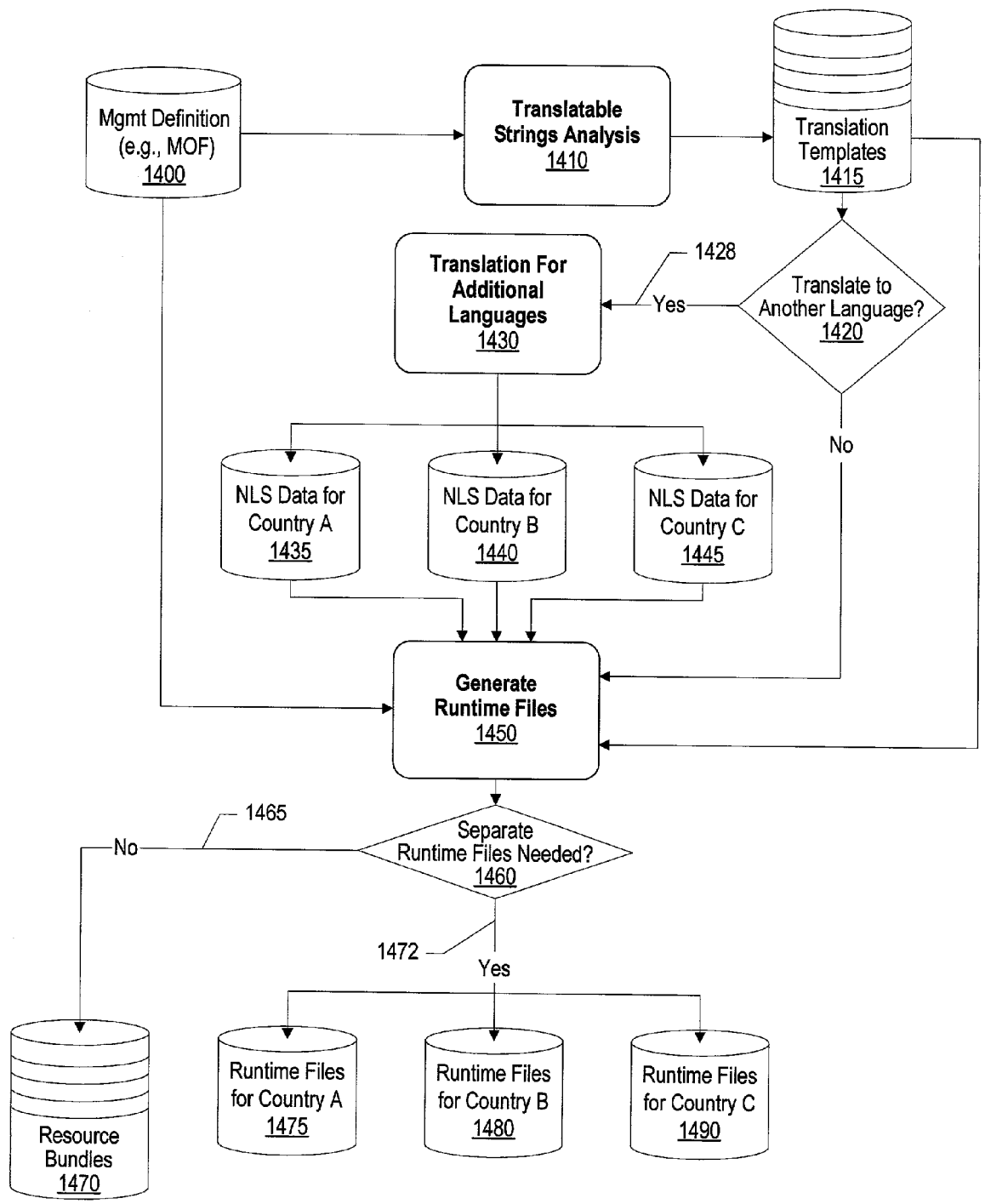
FIG. 14 is a high level diagram showing national language support files being translated and packaged into country-specific run time libraries.

A default set of NLS translation templates are generated (predefined process 260, see FIG. 14 for further processing details). NLS templates 262 are used by translators during translate step 265 in order to generate national language translations 268 that can be used to provide support for multiple languages.

A determination is made as to whether one or more of the automatically generated panels need to be modified (decision 235). If one or more panels need to be modified, decision 235 branches to "yes" branch 238 whereupon a user modifies the panels (step 240) stored in panel files data store 230. On the other hand, if none of the automatically created panels need to be modified, decision 235 branches to "no" branch 242 bypassing panel modification steps.

Console plug-in data 250 includes information describing interfaces to various consoles. This data is used to generate plug-in components that can operate with the selected consoles (predefined process 245, see FIG. 3 for further processing details). The generated plug-in components are stored in plug-in components data store 255 for eventual packaging.

When the panels have been created, the plug-in components have been created, and the translation strings have been translated into the desired languages, the plug-in components, panels, and languages are packaged (predefined process 270) and stored onto distributable media package 275 for eventual distribution to customers. Note that predefined process 270 can be iteratively invoked. For example, a single-language version may be initially packaged. When translation is completed, other NLS versions can be created or a new version can be packaged that allows the customer to choose between the various available languages. In addition, it will be appreciated by those skilled in the art that some processing and packaging is performed at an early stage (i.e., before the code is delivered to the customer) in order to improve efficiency. It will be appreciated that many of the steps described above could be performed at runtime on the customer's computer system by reading the MOF file during runtime and processing the MOF file data accordingly. Create distributable media processing subsequently ends at 295.

Figure 3:
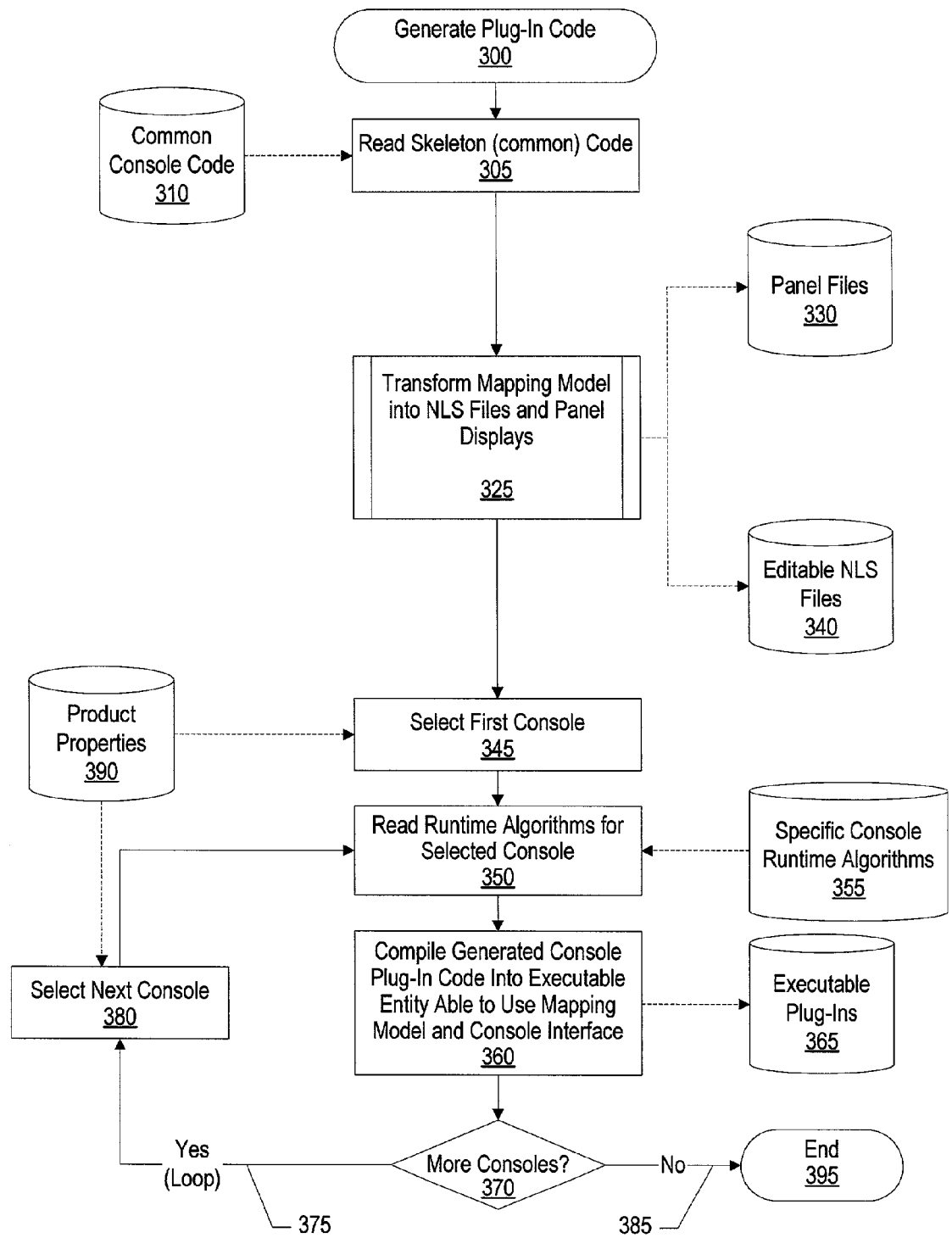
FIG. 3 is a flowchart showing the process of creating console plug in files.

FIG. 3 is a flowchart showing the process of creating console plug in files. Processing commences at 300 whereupon common code usable with all consoles is read (step 305) from common console code data store 310. The mapping model in the management definition object (MOF) is transformed in order to generate GUI panels 330 and Editable NLS Files 340 in predefined process 325. Editable NLS Files 340 are generated for translation into one or more languages in order to support users' native languages. Editable NLS files 340 include text needed for display on GUI panels 330, menu items, and nodes on the displayed tree control. In one embodiment, the editable NLS files include translatable strings that are used as input to a translation process whereby a program and/or a translation specialist translates the translatable strings into the desired languages. GUI panels 330 are panels created with specifications for the layout of the GUI panels.

The first console for which plug-in components will be generated is selected (step 345) from product properties data store 390. Specific runtime algorithms that apply to the selected console are read (step 350) from specific console runtime algorithms data store 355. The generated console plug-in component is compiled into an executable entity (step 360) that is able to use the mapping model from the management definition object (MOF) and interface with the selected console. The resulting executable entity is stored in executable plug-in components data store 365 for eventual packaging and distribution to a customer.

A determination is made as to whether there are more consoles for which executable plug-in components are needed (decision 370). If there are more consoles, decision 370 branches to "yes" branch 375 whereupon the next console is selected (step 380) from product properties data store 390 and processing loops back to process the selected console. This looping continues until there are no more consoles to process, at which point decision 370 branches to "no" branch 385 and processing ends at 395.

Figure 4:
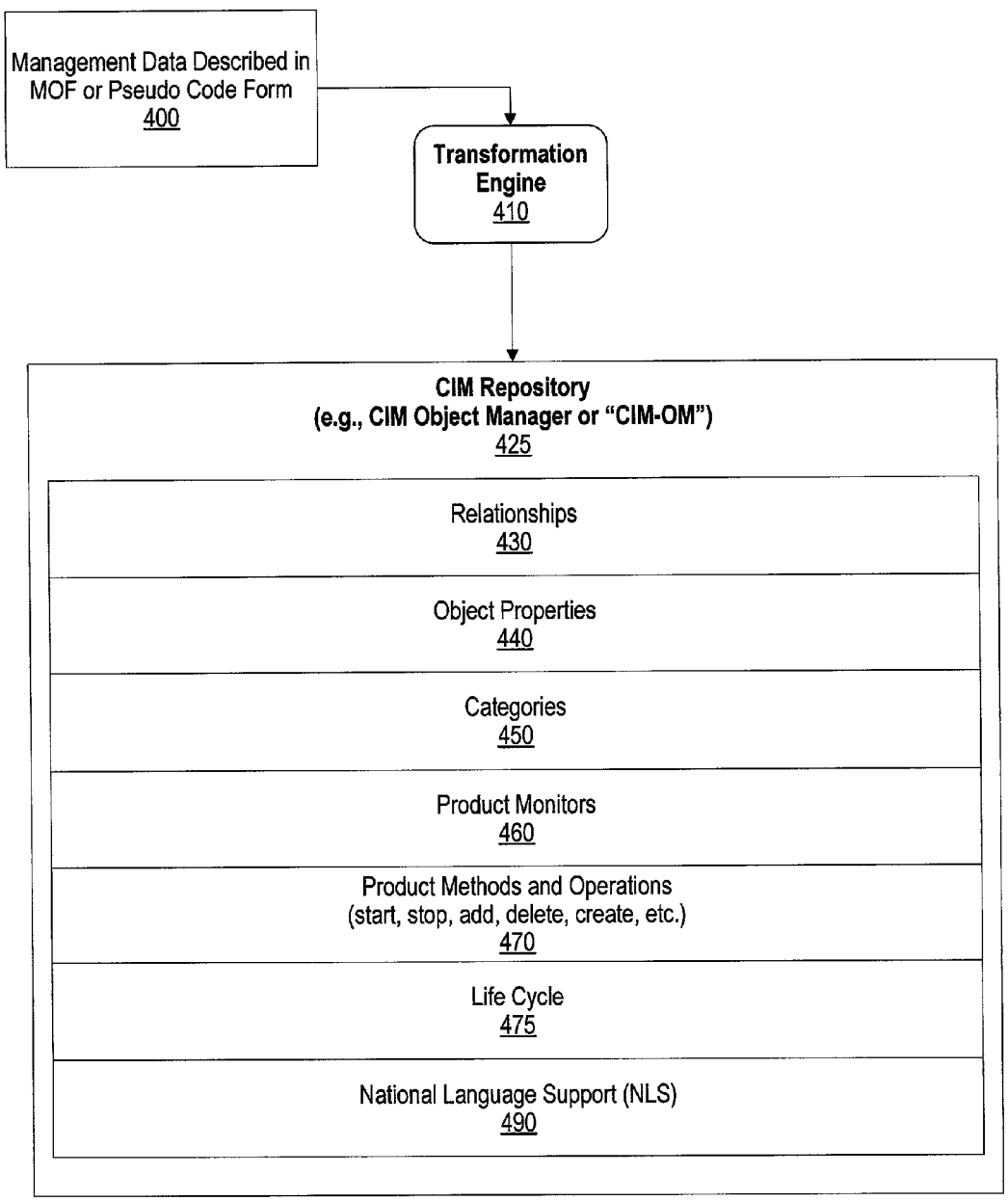
FIG. 4 is a high level diagram of a code file being transformed into a formatted definition object file including data elements derived from the code file.

FIG. 4 is a high level diagram of a management model (e.g., a MOF file) being loaded into a management object repository and service. Management data object 400 is a MOF file or data stream that includes a formal definition of the management model (e.g., a CIM model). The management data object 400 can contain extensive information about the management model, however the various types of data are often difficult to ascertain from the raw management data object. In order to process the management data object, transformation engine 410 creates a structured representation of various aspects of the management data object. Transformation engine 410 is a parser that reads MOF file 400 and feeds the data to a Common Information Model Object Manager (CIMOM) that is being used. Generally, the transformation engine and CIMOM are packaged together. It will be appreciated by those skilled in the art that the steps described herein can be performed with any variety of CIMOMs and transformation engines. To ensure compatibility with multiple CIMOMs and transformation engines, standard APIs specified in the CIM specification set forth by the Distributed Management Task Force, Inc. (DTMF) are used. All compliant CIMOMs conform to the standard APIs set forth in the CIM specification.

CIM Repository 425 (or "CIM-OM" for CIM Object Manager) receives data from transformation engine 410. While CIM Repository 425 is shown as a system, it may include only certain types of management object data depending which models have been loaded into the CIM-OM at a given time. In one embodiment, a set of Application Programming Interfaces (APIs) is used to extract the data shown from a MOF that includes a CIM model. These APIs, called CIM Object Manager (CIM-OM) APIs are able to extract various information from a CIM-OM that includes a CIM model.

The various types of information extracted from management data object 400 and included in CIM Repository 425 include relationship information 430, object properties information 440, categories information 450, product monitors information 460, product methods and operations information 470, life cycle information 475, and national language support (NLS) information 490.

Relationship information 430 includes information that can be used to display information in a tree control on a management console. For example, a root node may have zero, one, or more child nodes. The child nodes each describe a different aspect, or subject, pertaining to the root nodes. Each of the child nodes also has zero, one, or more child nodes ("grandchildren" of the root node), which include more detailed information pertaining to their parent. These relationships and tree levels can be quite deep and include large quantities of information pertaining to the management data object. See FIGS. 10–12 for further details regarding tree node processing.

Returning to FIG. 4, object properties information 440 include information about the various objects included in the management data object. Object properties may include the object's name, data type, and other information that pertains to individual objects. Object properties include data element names that correspond to the object. In addition, object properties also include qualifiers that are used to group one or more data elements. Other object properties may specify valid data types and values that correspond with one or more data elements, as well as list items that are used to allow the user to select from a list of valid values. These qualifiers, data element names, and data element attributes are used to display GUI panels from a management console allowing a user to view and manipulate values associated with the product (see FIG. 9 for an example GUI panel). Examples of properties include caption, description, node name, states (e.g., started, stopped), modes (e.g., Start Mode), and the names of parameters to a particular method. Property names are usually designated by designers of the CIM model, rather than being fixed or predetermined.

Category information 450 includes categorical information that pertains to the management data object. Examples of categories include Identification, Configuration Setting, Consumption, Status, Activity, and Unknown.

Product monitors information 460 include information used to monitor the management system described by the management data object. These monitors are used to gather information about the management system and display it to a user that is using a management console.

Product methods and operations information 470 include method and operation information about objects that are used to start the object, stop the object, add a new object, delete an instance of an object, etc. A user makes requests regarding objects displayed on a management console, such as in a tree view. Menus are dynamically created that allow the user to perform operations (start, stop, add, etc.) with the object. The identified methods are used to perform the operation requested by the user.

Lifecycle information 475 includes information regarding an object's current status that determine what operations can be performed against the object at a given point in time. For example, an object that is already started may be stopped but cannot be created because it has already been created. Other rules may be included in lifecycle information 475 so, for example, a given object, once it is started, may have to be stopped before it can be deleted.

National language support (NLS) information 490 includes information for accessing national language support data when enabled. National language support provides translated strings that are included on display panels in order to convey information to the user in a language of the user's choice. NLS information may include the various languages that are supported as well as information identifying the name and location of files that include the translated strings.

Figure 5:
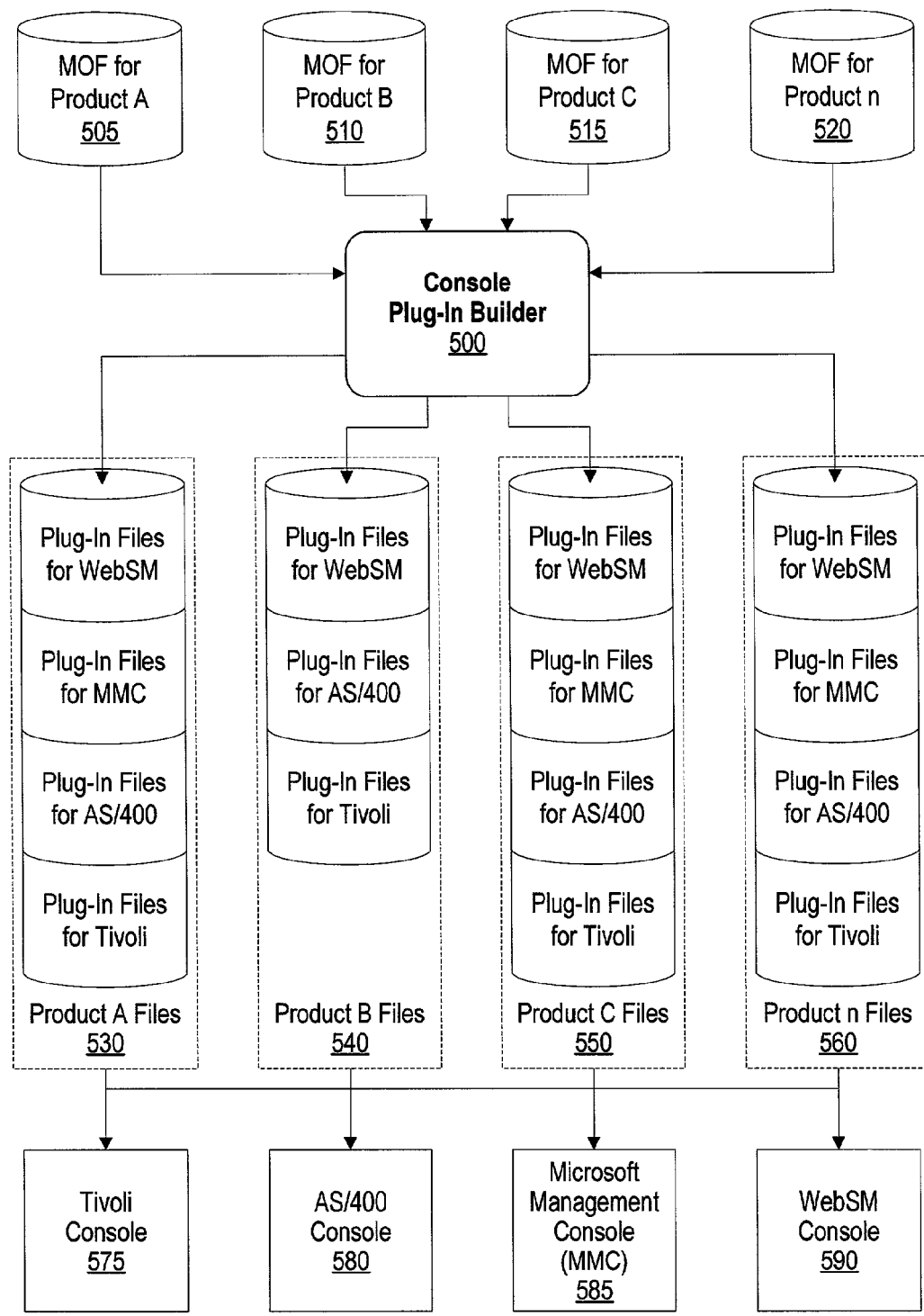
FIG. 5 is a high level diagram of a console plug in builder being used to generate plug in data for a variety of consoles.

FIG. 5 is a high level diagram of a console plug in builder being used to generate plug in data for a variety of consoles. In the example shown, several different products each have a management data object file associated with them (MOF 505 for Product A, MOF 510 for Product B, MOF 515 for Product C, and MOF 520 for Product n).

Console Plug-In Builder 500 processes the MOF files corresponding to the various products and creates plug-in components for various management consoles. Each product can be used to generate plug-in files for one or more of the available management consoles. For example, Product A 505 may be processed by Console Plug-In Builder 500 to create plug-in components (Product A files 530) for all available consoles (in the example shown, the available consoles include Tivoli Console 575, AS/400 Console 580, Microsoft Management Console 585, and WebSM™ Console 590). On the other hand, Product B 510 may be processed in order to create plug-in components (Product B files 540) for Tivoli Console 575, AS/400 Console 580, and WebSM Console 590. Product C 515 and Product n 520 may also be processed to create plug-in components (Product C files 550 and Product n files 560) for all available consoles.

Figure 6:
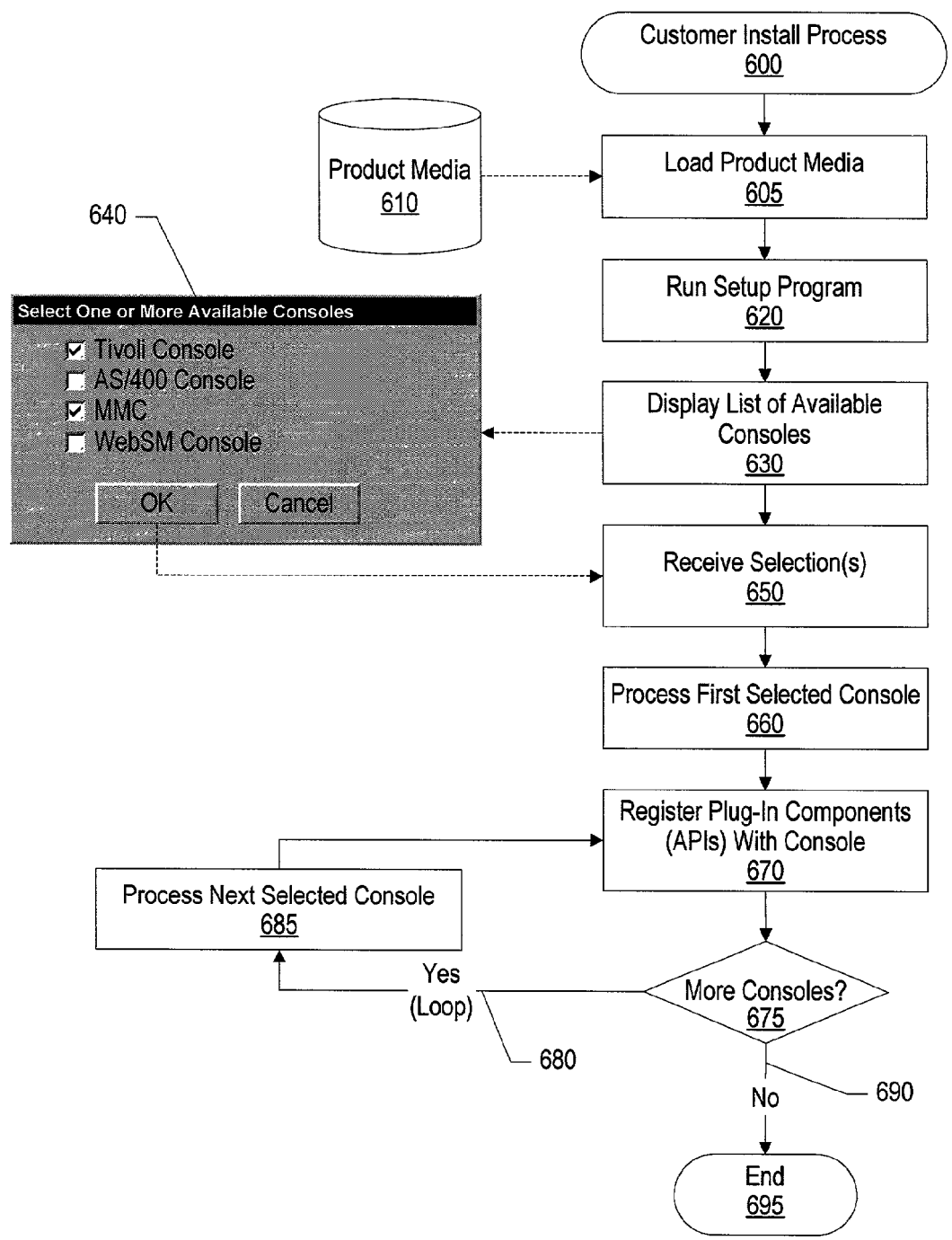
FIG. 6 is a flowchart showing the customer installation process for installing plug in code for selected consoles.

When a user installs the various products, a display is provided to allow the user to select which of the available management consoles the user wishes to use. If the user wishes to use the Tivoli Console, then plug-in components for Tivoli Console 575 are processed to interact with the Tivoli Console that is available on the user's computer system. In the example described above for Product A where plug-in components for four system consoles were created, the user can select which of the four consoles he wishes to use. The user may select to install the plug-in components for Tivoli Console 575 and Microsoft Management Console 585, in which case the selected console plug-in components are installed from plug-in components for Tivoli 575 and plug-in components for MMC 585. FIG. 6 includes details regarding the customer plug-in installation process.

FIG. 6 is a flowchart showing the customer installation process for installing plug in code for selected consoles. Processing commences at 600 whereupon the customer loads product media 610 (step 605) and runs a setup program associated with the product (step 620). Product media may be a removable media, such as a removable optical or magnetic storage media, such as a floppy disk or CD-R/RW disc, or may be a stream of data transmitted from a software distribution center, such as a file transmitted over a computer network or included as an email attachment.

Upon running the setup program, the setup program displays a list of available consoles (step 630) with which the product can interface. The list of available consoles depends upon which consoles the software manufacturer selected when performing console builder operations (see FIG. 5 for further details). The list of available consoles is displayed in display panel 640. In the example shown in display panel 640, the product that the customer is installing has plug-in components that allow the product to operate with the Tivoli Console, the AS/400 Console, the Microsoft Management Console (MMC), and the WebSM Console. The customer selects one or more of the available consoles depending upon the consoles available on the customer's system or those consoles the customer is planning to install. In the example shown, the customer has selected the Tivoli Console and the Microsoft Management Console. When the customer is finished with his selections, he presses "OK" whereupon the setup program receives the customer's selections (step 650).

The first console that was selected by the customer is processed (step 660) whereby console files located on product media 610 are loaded onto the customer's computer system. After the console plug-in components are loaded onto the customer's computer system, APIs corresponding to the installed plug-in components are registered with the console (step 670) so that the console is able to invoke the plug-in components and interface with plug-in component data.

A determination is made as to whether there are more consoles that the customer selected (decision 675). If there are more selected consoles that need to be processed, decision 675 branches to "yes" branch 680 which loops back to process the next selected console (step 685) by installing the console plug-in components and register the console plug-in components with the console. This looping continues until there are no more selected consoles, at which point decision 675 branches to "no" branch 690 and processing ends at 695.

Figure 7:
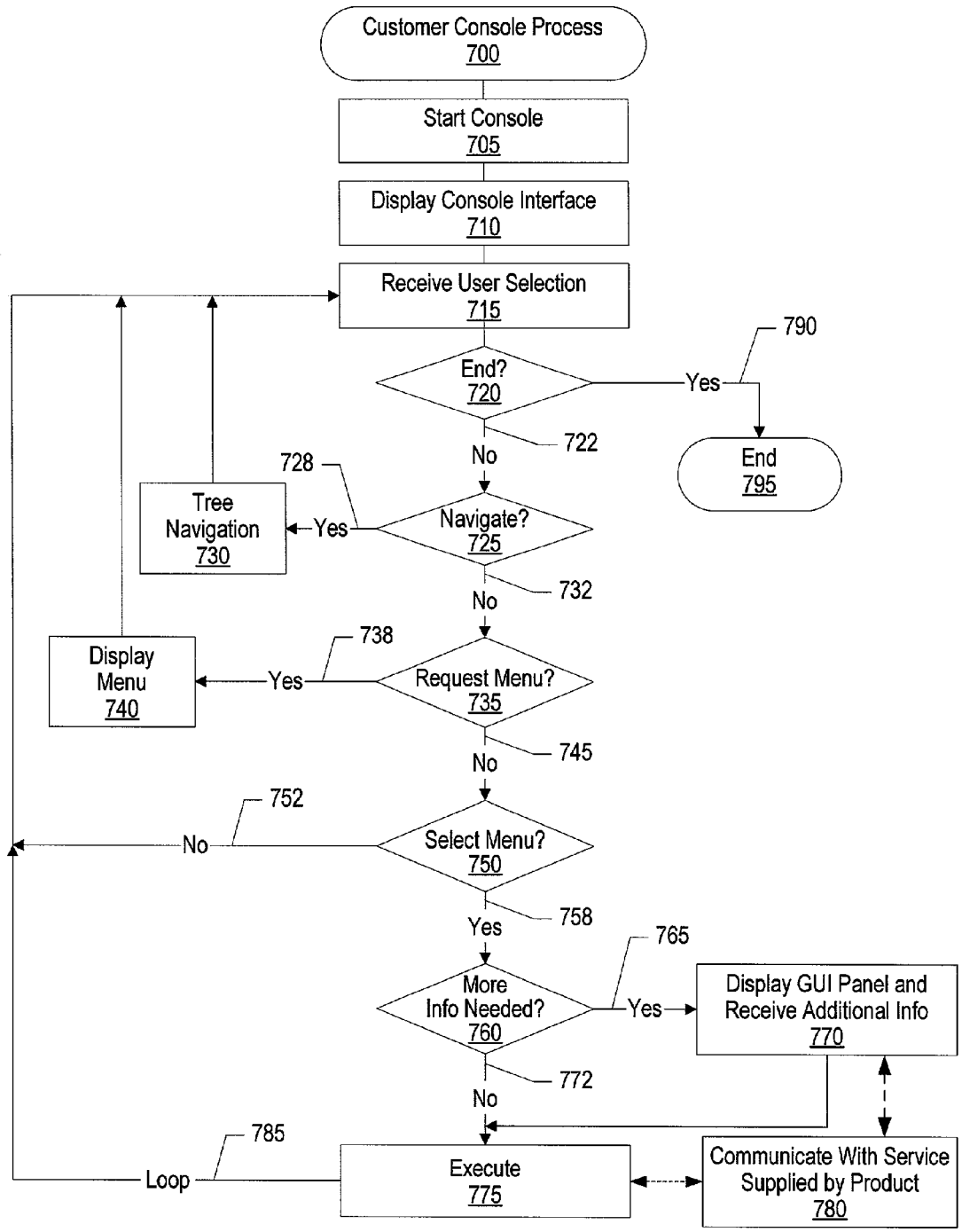
FIG. 7 is a flowchart showing customer console processes performed after plug in code installation.

FIG. 7 is a flowchart showing customer console processes performed after plug in code installation. Processing commences at 700 whereupon a user starts a management console for which plug-in components have previously been installed (step 705). The console interface is displayed (step 710) to the user which shows information pertaining to one or more products, information for which can be viewed and manipulated from the console.

A selection is received from the user (step 715). A determination is made as to whether the user requested to end console processing (decision 720). If the user requested to end console processing, decision 720 branches to "yes" branch 790 whereupon the console is stopped and processing ends at 795. On the other hand, if the user's request is not to end console execution, decision 720 branches to "no" branch 722 in order to process the user's request.

A determination is made as to whether the user has selected to navigate the tree control displayed on the management console (decision 725). If the user selected navigation of the tree control, decision 725 branches to "yes" branch 728 whereupon tree navigation is performed (step 730) and processing loops back to receive the next user selection. On the other hand, if the user did not select navigation of the tree control, decision 725 branches to "no" branch 732 to identify and process the user's selection.

A determination is made as to whether the user has requested a menu (i.e., a popup menu) from the management console (decision 735). If the user selected a menu, decision 735 branches to "yes" branch 738 whereupon the selected menu is displayed (step 740) and processing loops back to receive the next user selection. On the other hand, if the user did not select a menu, decision 735 branches to "no" branch 745 to identify and process the user's selection.

A determination is made as to whether the user has requested a menu selection (i.e., a selection from a popup menu) from the management console (decision 750). If the user did not select a menu selection, decision 750 branches to "no" branch 752 which loops back to identify and process the next user selection. On the other hand, if the user did select a menu selection, decision 750 branches to "yes" branch 758 to process the user's menu selection. Another determination is made as to whether more information is needed in order to process the user's selection (decision 760). If more information is needed, decision 760 branches to "yes" branch 765 whereupon a GUI panel is displayed and additional information is received in order to process the selection (step 770). In addition, step 770 may also communicate with the product's service provider, as shown, to obtain information included in the GUI panels. If no more information is needed, decision 760 branches to "no" branch 772 bypassing the generation and display of additional GUI panels.

The user's menu selection is executed (step 775). Execution of the user's menu selection may include backend processing with a service supplied by the product being administered by the management console session (step 780). For example, if the user chose a method to execute, a request is sent to the product's service provider requesting that the method be executed. The service provider executes the method on the product and returns the results for display to the user. For instance, if the user chooses to 'drop' a selected DB/2 database table, the DB/2 service provider is sent a request to drop the selected table. The actual dropping of the table is done by the service provider. The product returns the requested information and the information is displayed on the user's display, such as information retrieved and displayed in a popup menu. Processing loops back (loop 785) to process the next user selection. This looping continues until the user selects to end the console process, at which time decision 720 branches to "yes" branch 790 and processing ends at 795.

Figure 8:
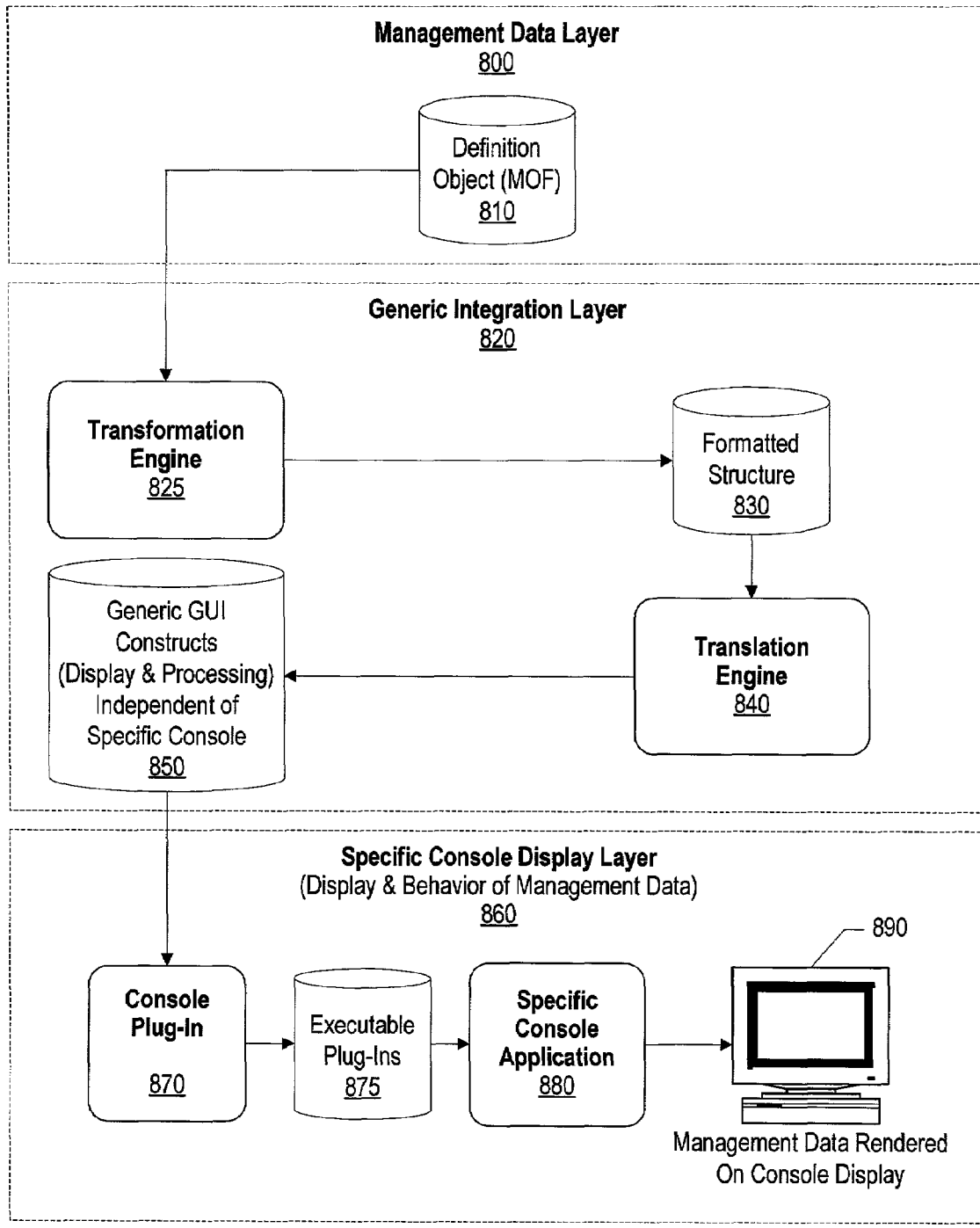
FIG. 8 is a high level diagram of data layers including a management data layer, a console data layer, and the generated generic integration data layer.

FIG. 8 is a high level diagram of data layers including a management data layer (800), a console data layer, and the generated generic integration data layer (820). Management data layer includes the CIM model (MOF) or pseudo code that describes the management system. Definition object 810 is a file or object that includes the CIM model or pseudo code describing the management system.

Generic integration layer 820 includes generic representations of the management data. Transformation engine process 825 processes the CIM model or pseudo code to create formatted management data structure 830. In a CIM implementation, a variety of available APIs are used to transform the CIM model into a formatted representation (see FIG. 4 for details regarding the formatted representation). Translation engine process 840 is used to process formatted management data structure 830 to create generic constructs 850 that are independent of any specific console. Generic GUI constructs 850 include both display and processing constructs. In one embodiment, the display constructs include graphical user interface (GUI) panels in a generic format, such as using Java or extensible markup language (XML) that can be processed on a variety of computer systems irrespective of the operating environment, or operating system, used by the computer system.

Specific console display layer 860 manages the display and behavior of the management data on a specific console. Console plug-in builder process 870 processes generic constructs 850 to create specific plug-in components 875 that are built for a specific console. Application programming interfaces (APIs) used to invoke the specific plug-in components are registered with specific console application 880 so that the display and processing constructs included with the plug-in components are accessible from the specific console application. The user executes specific console application 880 whereby management data is displayed and manipulated by the user on console display 890 (see FIG. 9 for further details regarding display and handling of registered plug-in components).

Figure 9:
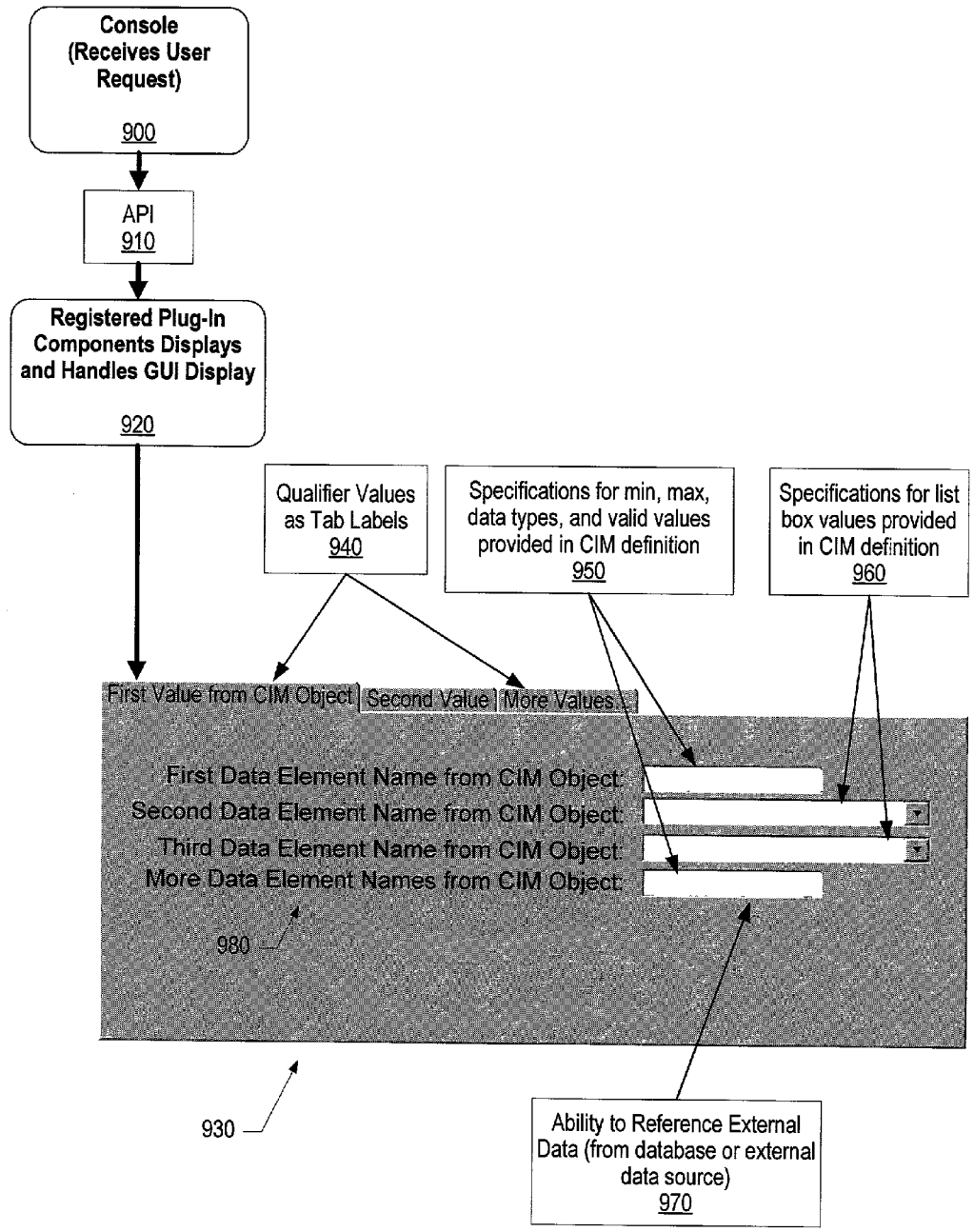
FIG. 9 is a high level diagram showing the creation of a GUI display panel from a CIM object file.

FIG. 9 is a high level diagram showing a GUI display panel derived from a CIM model. The user executes a specific console with which plug-in components have been installed and registered for a management system product. The specific console, such as the Tivoli console, the Microsoft Management Console (MMC), etc., receives various user requests (process 900). Some of these requests correspond to the management system product that was installed and for which APIs 910 were registered with the console. APIs 910 provide a conduit between the console and plug-in components, such as display panels and processing logic. The registered APIs 910 invoke registered plug-in components 920 that handle display of display panels, such as display panel 930, that allows the user to view and manipulate data corresponding to the management system product.

Display panel 930 includes a number of display attributes that were originally derived from the management definition object written for the management system product. Display 930 shows a number of menu tabs 940 used as containers in order to group management data. Qualifier names from the management definition object are used to create tab values displayed on menu tabs 940. In one embodiment, qualifiers named "category" are used to form the tab values. In addition, if national language support (NLS) is being used, the values of qualifier names 940 are retrieved from translated strings within NLS data files.

Data element names 980 are displayed on display panel 930 within a given qualifier located within the management data object. If national language support is being used, data element names 980 are retrieved from translated strings within NLS data files. Values associated with the various data elements are displayed in text boxes 950 and list boxes 960. Data displayed in text boxes and list boxes is retrieved from the management information system. If permitted by the management information system, the user can manipulate the values. The extent that the user can change values can also be set by the management data object so that minimum, maximum values, data types (i.e., integer, numeric, alphanumeric, etc.) can be enforced as well as valid values (i.e., numeric value from 0 to 5). List boxes 960 retrieve list elements from the management data object. The list elements display the valid values from which the user can select. The user can select a different tab label (940) to view and manipulate the data elements and values that correspond to other qualifier values.

In addition, data from external data sources 970 can be retrieved from the management data system (e.g., from a database or other data store). In many cases, the product being administered is the provider of external data sources 970. For example, display panel 930 may show details of certain product status information. In such a case, external data sources 970 might be used to display status information related to the product being administered. Details regarding external data sources 970 is defined in the management data object. In this manner, dynamic data that represents operations currently taking place in the computer system can be displayed and manipulated through display 930.

Figure 10:
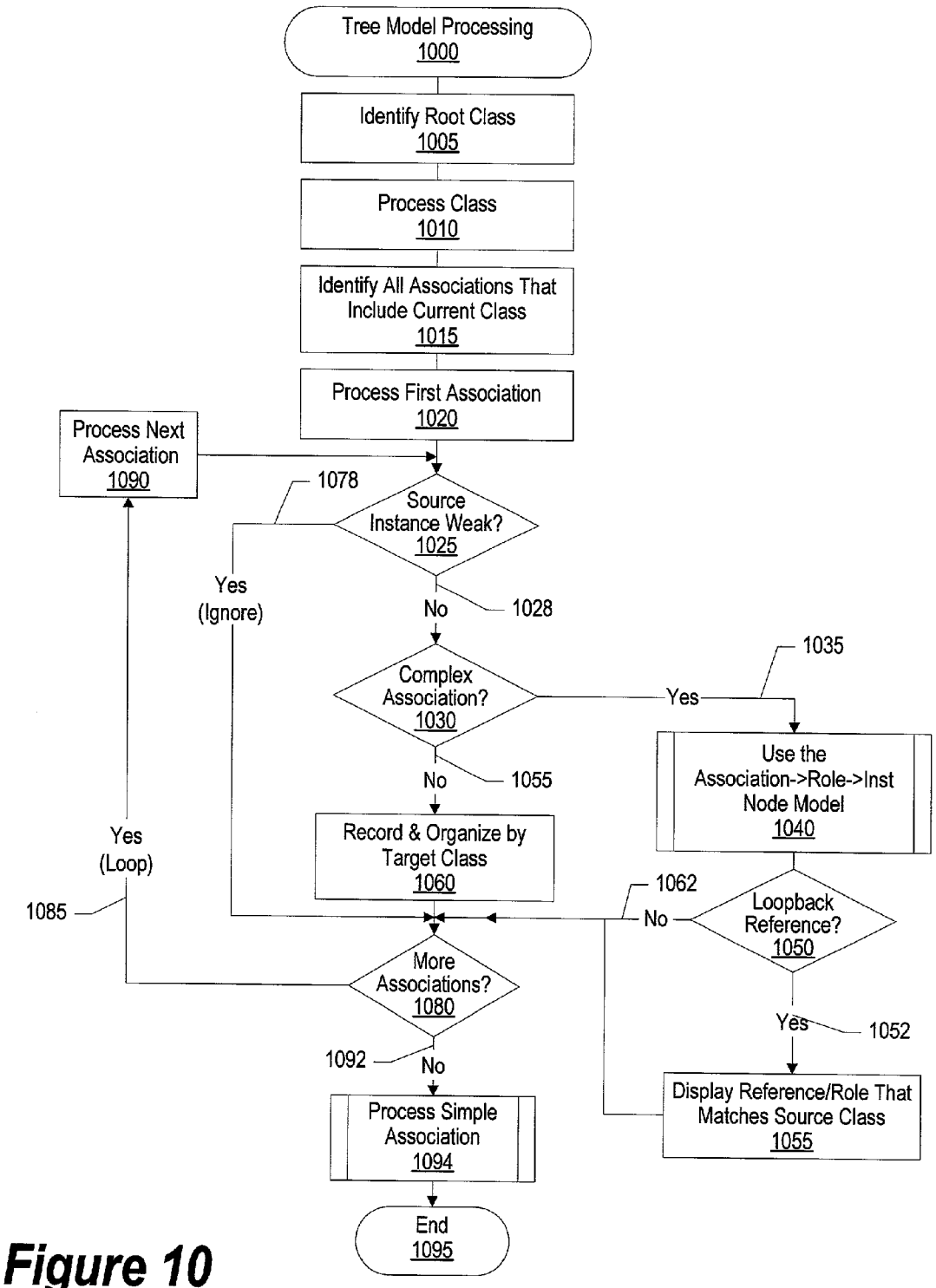
FIG. 10 is a flowchart showing the processing of management data in order to create a tree view displayable on a console.

FIG. 10 is a flowchart showing the processing of management data in order to create a tree view displayable on a console. Processing commences at 1000 whereupon a root class is identified (step 1005). The root class can be identified by using a naming convention to define the class in the management definition object (i.e., in the MOF). The root class can also be identified by prompting the developer for the root class name.

There are two variations of this process, one is runtime, the other is used to make a one time traversal of the tree. The one time traversal is not necessary unless preprocessing is desired where NLS strings, dialogs, menus, helper code etc are generated at build time and then made available at run time. This root class (and any subclasses) are processed (step 1010). All associations that include the current class are identified (step 1015). An association as defined in CIM includes linkages between classes or instances of classes. These linkages are called Roles. Each role has a name and a class type as well as other qualifiers. One of the potential qualifiers used in this algorithm is the WEAK qualifier. The first identified association is processed (step 1020). A determination is made as to whether the source instance is weak (decision 1025). Again, "Weak" is a CIM definition used to describe a relationship. The weak part of an association is identified by the "WEAK" qualifier. Part of the definition of WEAK is that the weak object does not exist without the other object in the association. For example, Database Tables usually only exist inside a database. This association is checked to ensure that the Source class is not contained by the target class. Only associations where the Source class contains the target class (or associations where there is no containment) are followed for tree node processing. If the source instance is weak, processing ignores this association. In this case, decision 1025 branches to "yes" branch 1078 whereupon another decision is made as to whether there are more associations to process (decision 1080). If there are more associations, decision 1080 branches to "yes" branch 1085 whereupon processing loops back to handle the next association (1090). This looping continues until there are no more associations, at which point decision 1080 branches to "no" branch 1092 and processing ends at 1095. However, if one-time traversal is being used, a record is kept for each target class that was processed. This list of target classes is then compared at this time to a list of classes processed as the root class. All those not having already been processed as a root are now processed, and the list of processed classes is updated.

Returning to decision 1025, if the source class is not weak, decision 1025 branches to "no" branch 1028 to further process the association. A determination is made as to whether the association is a complex or a simple association (decision 1030). If the association is a complex association, decision 1030 branches to "yes" branch 1035. A complex association is one in which there are three or more classes in the association or an association between a class and itself. For example, groups can contain groups, so this would be a complex association. The complex association uses a tree model where the nodes in the tree represent the Association Name, a sub-node for each Role in the association, and finally nodes for instances of each class to which the Role points (predefined process 1040). A determination is made as to whether there is a loopback reference (decision 1050). A loopback reference is where a class is associated to itself as in the "group" example described above. A particular group can both be in a group, and, contain other groups. Because of these possibilities, all the Roles of the association are displayed, and thus the reason for decision 1050. If there is a loopback reference, decision 1050 branches to "yes" branch 1052 whereupon the reference/role that matches the source class is displayed (step 1055). If there is not a loopback reference, decision 1050 branches to "no" branch 1062 bypassing loopback reference processing.

Returning to decision 1030, if the association is a simple association (rather than a complex association described above), decision 1030 branches to "no" branch 1055. The simple association is recorded and organized by target class (step 1060). A decision is made as to whether there are more associations to process (decision 1080). If there are more association, decision 1080 branches to "yes" branch 1085 whereupon processing loops back to handle the next association (1090). This looping continues until there are no more associations, at which point decision 1080 branches to "no" branch 1092 whereupon simple associations are processed (predefined process 1094, see FIG. 11 for further details) and processing ends at 1095.

Figure 11:
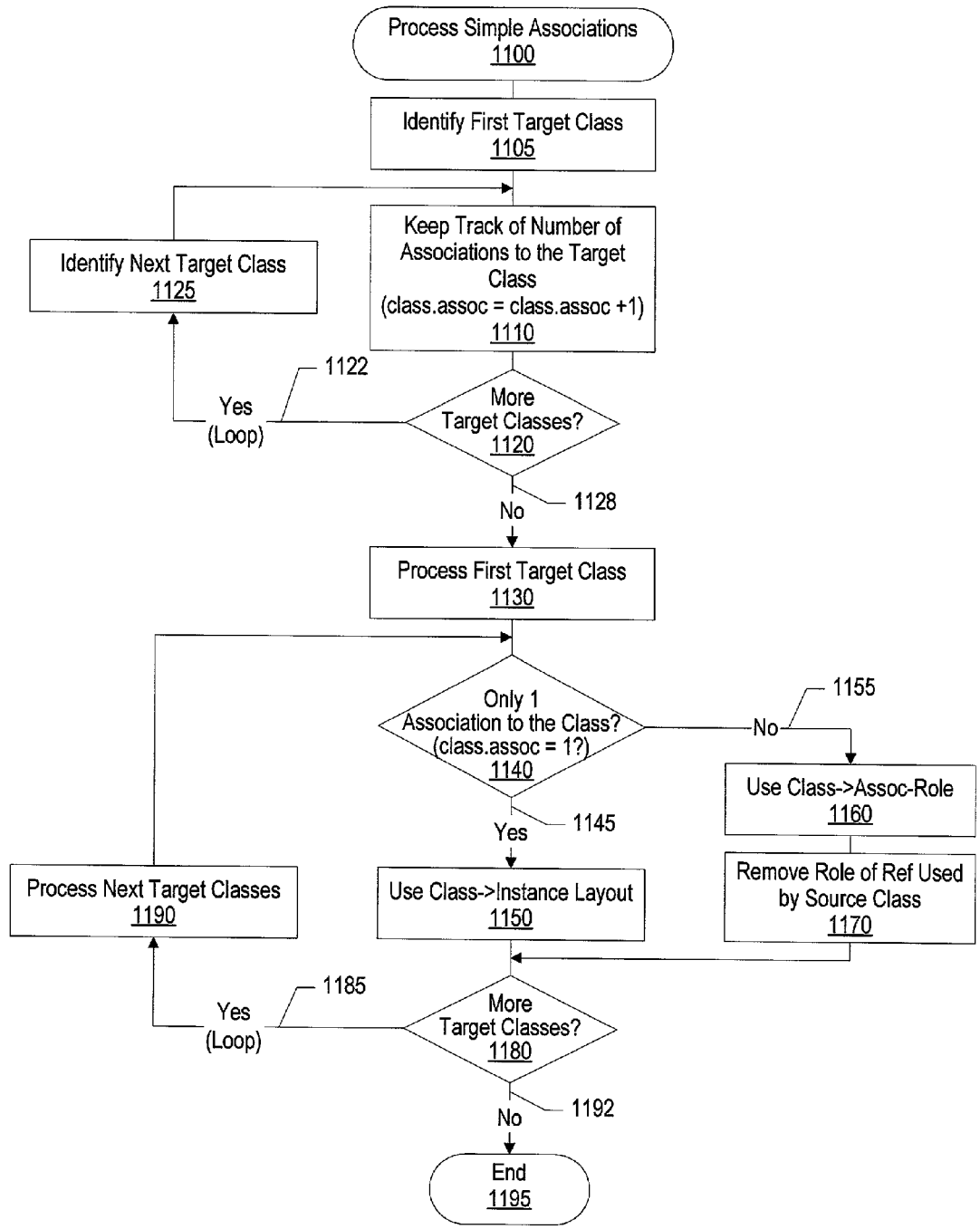
FIG. 11 is a flowchart showing tree view processing of a simple association found in the management data.

FIG. 11 is a flowchart showing tree view processing of a simple association found in the management data. Processing varies depending upon whether the simple associations are being processed prior to runtime (i.e., a onetime pass) or during runtime. If processing takes place during runtime, instances of the various classes are processed. In addition, during a onetime pass there may be the possibility of an association to a class, however there are no instances of the association until runtime.

Processing commences at 1100 whereupon the first target class is identified for the association (step 1105). The number of associations to the target class is calculated (step 1110). The number of association can be calculated by incrementing the number of association for the given class. A determination is made as to whether there are more target classes (decision 1120). If there are more target classes, decision 1120 branches to "yes" branch 1122 which identifies the next target class (step 1125) and loops back to process the next target class. This looping continues until there are no more target classes, at which point decision 1120 branches to "no" branch 1128 (i.e., the number of associations to each target class has now been calculated).

The first target class is processed (step 1130). A determination is made as to whether there is only one association to the target class (decision 1140). If there is only one association to the target class (i.e., class.association=1), then decision 1140 branches to "yes" branch 1145 whereupon the target class refers to the last association (step 1150). In this case, a Node is added to the display tree representing the class. Any instances of the class are then added as nodes below this "class node."

On the other hand, if there is more than one association to the target class, decision 1140 branches to "no" branch 1155 whereupon the tree representation uses a class node (step 1160) Association nodes are added to the class module. Each association node contains the appropriate Role Nodes. Instance nodes of the classes are added under each Role node. The Role Node for the source class is not added.

A determination is made as to whether there are more target classes to process (decision 1180). If there are more target classes to process, decision 1180 branches to "yes" branch 1185 which retrieves the next target class (step 1190) and loops back to process the next target class. This looping continues until there are no more target classes to process, at which point decision 1180 branches to "no" branch 1192 and processing ends at 1195.

Figure 12:
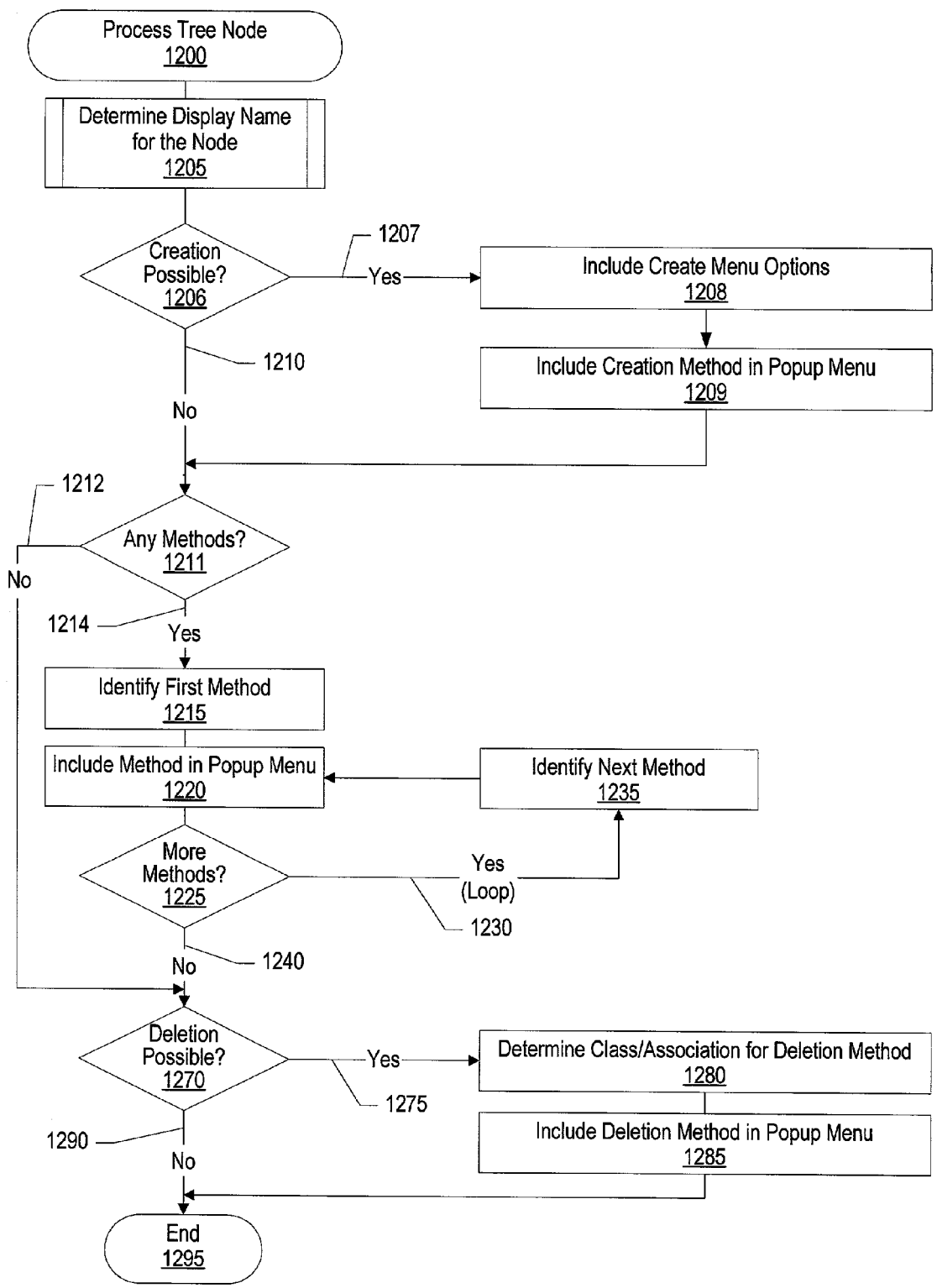
FIG. 12 is a flowchart showing processing steps taken to process an individual tree node.

FIG. 12 is a flowchart showing processing steps taken to process an individual tree node. Processing commences at 1200 whereupon a display name is determined for the node (predefined processing step 1205, see FIG. 15 for further details on determining display names). If the management system is enabled for national language support, the translated display names and menu item names are retrieved from NLS files. The various methods (i.e., add, delete, etc.) that are included in the menu are processed.

A determination is made as to whether it is possible to create other objects from this node (decision 1206). If it is possible to create other objects from this node, decision 1206 branches to "yes" branch 1207 whereupon the create menu options are included (step 1208) (i.e., the creatable menu items include the class of the source node itself, and any of its subclasses, etc.) and the creation method is included in the node's popup menu (step 1209). On the other hand, if it is not possible to create other objects from this node, decision 1206 branches to "no" branch 1210 bypassing the creation steps.

A determination is made as to whether there are any methods that should be included in the node's popup menu (decision 1211). If there are no methods, decision 1211 branches to "no" branch 1212 bypassing the method inclusion steps. On the other hand, if there are methods to include, decision 1211 branches to "yes" branch 1214 whereupon the first method in the menu is identified (step 1215) and included in the popup menu (step 1220). The methods are retrieved from the management model (e.g., MOF file). A determination is made as to whether there are more methods to include in the menu (decision 1225). If there are more methods in the menu, decision 1225 branches to "yes" branch 1230 which loops back to identify the next method in the menu (step 1235) and include the identified method in the popup menu (step 1220). This looping continues until there are no more methods to include in the popup menu, at which point decision 1225 branches to "no" branch 1240.

Another determination is made as to whether it is possible to delete nodes from the current node (decision 1270). If it is possible to delete nodes from the current node, decision 1270 branches to "yes" branch 1275 whereupon a class/association is determined for the deletion method (step 1280), and the deletion method is included in the popup menu (step 1285). On the other hand, if it is not possible to delete nodes from the current node, decision 1270 branches to "no" branch 1290 bypassing the deletion steps. Tree node processing subsequently ends at 1295.

Figure 13:
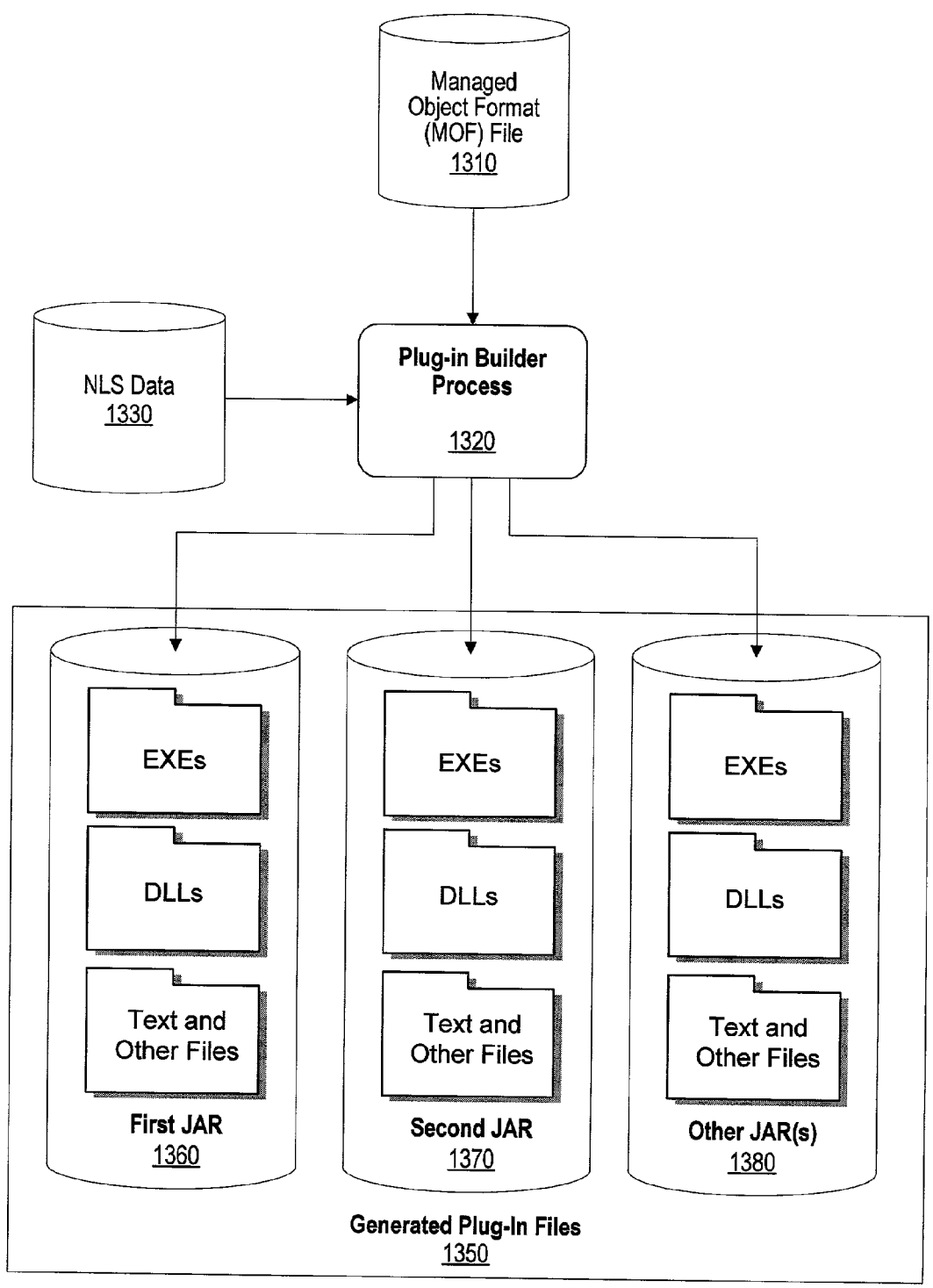
FIG. 13 is a diagram showing the process of creating various packaging files to support a management model.

FIG. 13 is a diagram showing the process of creating various packaging files to support a management model.

Managed object format (MOF) file 1310 is processed by plug-in builder process 1320 to create generated plug-in files 1350. In addition, NLS data 1330 includes translated strings used to provide national language support.

Generated plug-in files 1350 may include one or more containers, such as a directory or package file (i.e., a "zip" file or a Java "jar" file) that contains multiple files. In the example shown, generated plug-in files 1350 include First Jar 1360, Second Jar 1370, and Other Jar(s) 1380. Each of the Jar files include a number of generated plug-in files that can be installed by a user to support various processing. For example, First Jar 1360 may be configured to support a particular type of installation, for example a Tivoli Enterprise Console installation, and Second Jar 1370 may be configured to support another type of installation, for example a Microsoft Management Console (MMC) installation. Other Jar(s) 1380 may be configured to support other consoles or other types of installations.

Each Jar includes a number of different types of files, or objects. For example, each Jar can include a subdirectory that includes a number of executable files, another subdirectory that includes a number of dynamically linked libraries (DLLs), as well as other subdirectories that include text (including translated strings for NLS support), bitmaps, and other types of files. Generated plug-in files 1350 may be stored on a distributable media, such as a removable non-volatile storage media, for distribution to a customer. Generated plug-in files 1350 may also be transmitted electronically through a computer network or other telecommunications means to a customer. The customer then uses generated plug in files to select desired installation options. Depending on the customer's chosen installation options, one or more Jars included in the generated plug-in files will be used to install plug-in files FIG. 14 is a high level diagram showing national language support files being translated and packaged into country-specific run time libraries. Management definition file 1400, such as a CIM management object format (MOF) file is processed by translatable strings analysis process 1410 to extract translatable strings from the object model file.

One or more translation templates 1415 are prepared depending upon the number of language translations included in the CIM model. A determination is made as to whether translation will be performed for other languages (decision 1420). If there will be no translations, then translation templates are optionally used and processing branches to "no" branch 1422 and processing continues at 1450. On the other hand, if the developers of the product wish to perform additional translations, decision 1420 branches to "yes" branch 1428 whereupon a translation process is performed (process 1430). During the translation process, the translation templates are used by translators to create translated strings in various languages. The various language translations are stored in various files. In the example shown, the translated national language support (NLS) files include translated files for country A 1435, country B 1440, and country C 1445. In addition, the CIM specification allows for translated strings to exist inline within MOF file 1400. These were extracted from the CIM model to create a language template for each language found in the model.

Generate runtime files process 1450 is used to create runtime files using the logic found in MOF file 1400 along with the translated strings found in NLS files (1435, 1440, and 1445) as well as potential translated strings found in MOF file 1400. A determination is made as to whether separate runtime files are needed for the various national language (decision 1460). In some cases separate runtime files are not needed for each country. In this case, decision 1460 branches to "no" branch 1465 and the translated files are added to a common file, such as Java resource bundle 1470, which includes translations for all countries. In other cases, separate files are needed for each country. In this case, decision 1460 branches to "yes" branch 1472 whereupon separate runtime files are created for each country (runtime files for country A 1475, country B 1480, and country C 1490). When a customer installs the generated plug-in files he can now choose a national language from among the supported languages so that the national language of choice is used to display menus and other display panels to the user. The national language items for display will then either be pulled from a common resource bundle (i.e., Resource Bundle 1470), or from a runtime package that includes the selected language (i.e., runtime files for country A 1475, country B 1480, and country C 1490).

Figure 15:
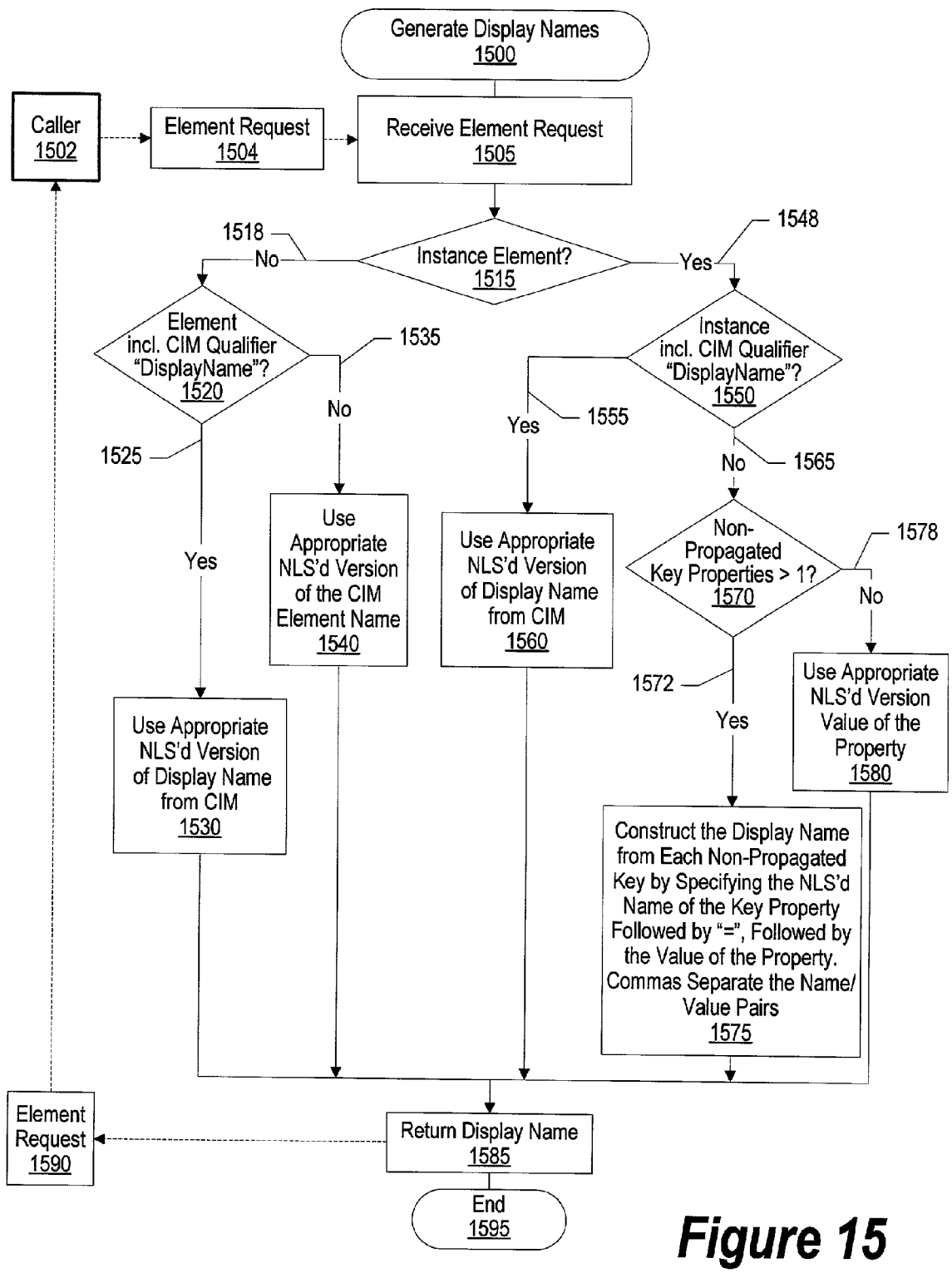
FIG. 15 is a flowchart showing steps taken to derive display names from information included in the management data file.

FIG. 15 is a flowchart showing steps taken to derive display names from information included in the management data file. Processing commences at 1500 whereupon element request 1504 is received (step 1505) from caller 1502. A determination is made as to whether the element is an instance element (decision 1515). If the element is not an instance element, decision 1515 branches to "no" branch 1518 whereupon a determination is made as to whether the element includes a qualifier that defines the display name, in other words a qualifier of "DisplayName" (decision 1520).

If the element does include a predefined display name qualifier, decision 1520 branches to "yes" branch 1525 whereupon the appropriate NLS'd version of the display name qualifier from the CIM is used for the display name. On the other hand, if the predefined display name qualifier is not found, decision 1520 branches to "no" branch 1535 whereupon the appropriate NLS'd version of the CIM element name is used as the display name (step 1540).

To retrieve the appropriate NLS'd version of the display name (in each applicable process described herein), the system checks whether the CIMOM (CIM Object Manager) has a language translation for the name actually embedded in the CIM. If this is found, then the embedded name is used. If this is not found, then the NLS files are checked to see if the name is included for the appropriate language. If the name is included in an NLS file, the name found in the NLS file is used, otherwise the default version of the name is used.

Returning to decision 1515, if the element is an instance element, decision 1515 branches to "yes" branch 1548 whereupon a determination is made as to whether the instance element includes a qualifier that defines the display name, in other words qualifier of "DisplayName" (decision 1550).

If the element does include a display name qualifier, decision 1550 branches to "yes" branch 1555 whereupon the NLS'd version of the display name qualifier is used for the display name. On the other hand, if there is no display name qualifier, decision 1550 branches to "no" branch 1565 whereupon a determination is made as to whether there are more than one non-propagated key properties (decision 1570). If there are more than one non-propagated key properties, decision 1570 branches to "yes" branch 1572 whereupon the display name is constructed from each non-propagated key (step 1575). A key property is part of a larger identifier that is used to uniquely identify an element. A non-propagated key value means that the particular value is not being passed down from a parent object to the element. The construction of the display name is performed by specifying the national language translated string corresponding to the key property name followed by an equal sign ("=") which is followed by the value of the property with commas separating the name/value pairs from one another. For example, in a database example with more than one database and table being used, a constructed display names may appear as "Database=Sales,Table=Expenses" and "Database=Products,Table=Catalog." On the other hand, if there is not more than one non-propagated key property, decision 1570 branches to "no" branch 1578 whereupon the value of the property (e.g. "Expenses") is used as the display name (step 1580).

After the element has been processed and the appropriate name has been retrieved as described above, the retrieved display name is returned (step 1585) to caller 1502 through element response 1590. Processing subsequently ends at 1595.

Figure 16:
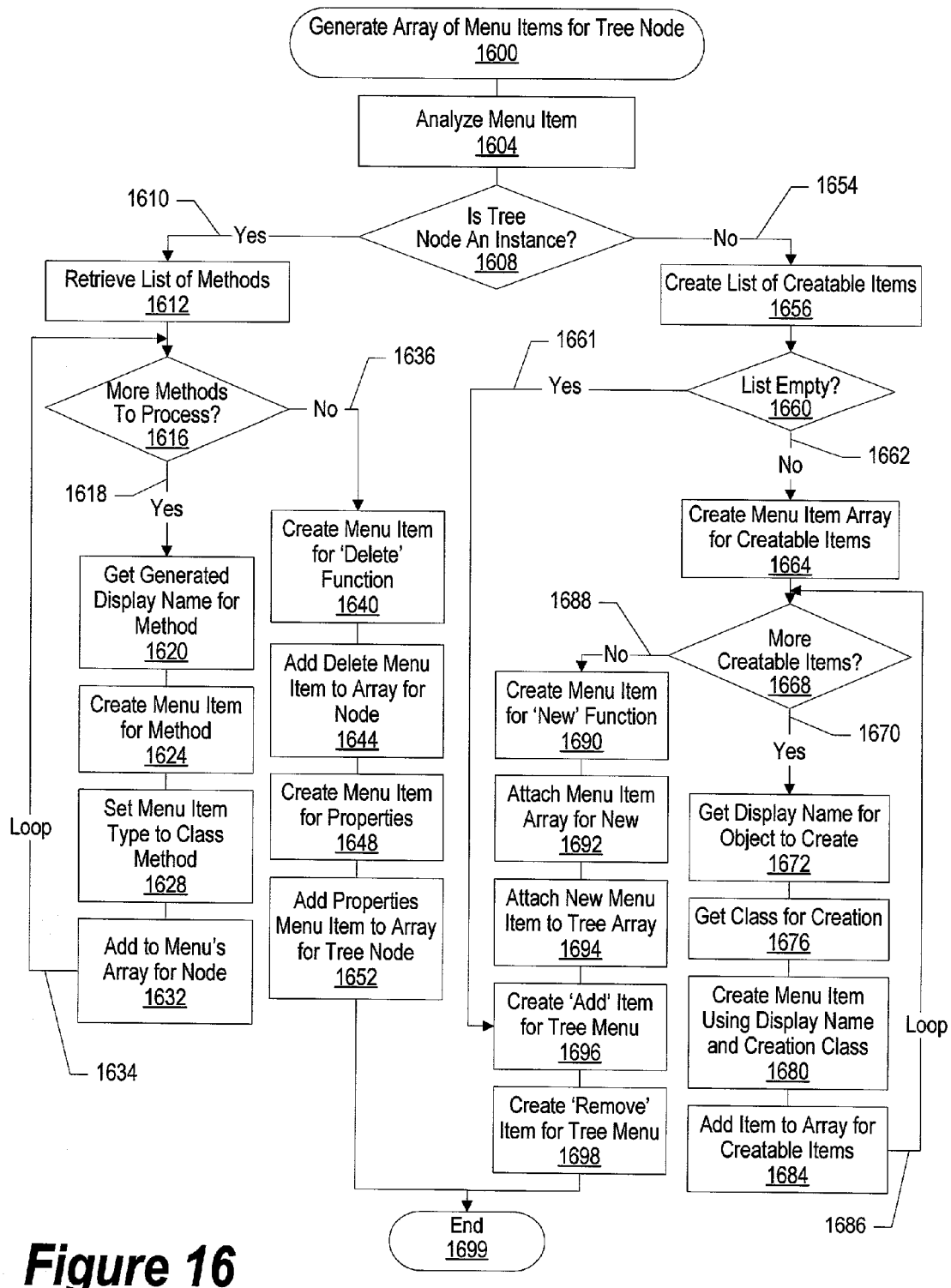
FIG. 16 is a flowchart showing steps taken to dynamically generate a menu item.

FIG. 16 is a flowchart showing steps taken to generate an array of menu item for a tree node. Processing commences at 1600 whereupon the menu item is analyzed (step 1604).

A determination is made as to whether the tree node is an instance of an object (decision 1608). If it is an instance of an object, decision 1608 branches to "yes" branch 1610 whereupon a list of methods corresponding to the tree node are retrieved (step 1612). The tree node methods may be retrieved from a managed object format (MOF) file.

A determination is made as to whether there are methods to process corresponding to the tree node (decision 1616). If there are methods to process, decision 1616 branches to "yes" branch 1618 to process one of the methods. A generated display name is retrieved for the method. If there is a translated name for the method name, the translated name is retrieved (step 1620) from either the MOF file or from a separate translation file that includes translation strings for one or more languages. A menu item is created (step 1624) for the method using the retrieved method display name (obtained at step 1620). The menu item type is set to "method" (step 1628) indicating that the method item corresponds to an executable "method." The menu item and menu item type are added to the menu's array for the tree node (step 1632). Processing loops back (loop 1634) to determine whether there are additional methods to process (decision 1616). This looping continues until there are no more methods to process, at which time decision 1616 branches to "no" branch 1636.

After all methods for the tree node have been processed and decision 1616 branches to "no" branch 1636, a menu item for a "delete" function is created (step 1640). The created delete menu item is added to the array corresponding to the tree node (step 1644). A menu item is also created for a "properties" function (step 1648). The created properties function menu item is also added to the array corresponding to the tree node (step 1652). Processing subsequently ends at 1699.

Returning to decision 1608, if the tree node is not an instance of an object, decision 1608 branches to "no" branch 1654. A list of creatable items is created from information included in the MOF file (step 1656, see FIG. 18 for further details. A determination is made as to whether the list is empty indicating that the node has no creatable items (decision 1660). If the list is empty, decision 1660 branches to "yes" branch 1661 bypassing steps taken to process creatable items, whereupon an "add" item is created for the tree menu (step 1696) along with a "remove" item (step 1698) before processing ends at 1699.

On the other hand, if the list of creatable items is not empty, decision 1660 branches to "no" branch 1662 in order to process the list of creatable items. A determination is made as to whether there are more creatable items to process (decision 1668). If there are more creatable items to process, decision 1668 branches to "yes" 1670 to process the next creatable item. A display name is retrieved corresponding to the object that can be created from the tree node (step 1672). A translated version of the display name is retrieved from either a MOF file or a separate translation file if such a translation exists. An object class corresponding to the item that can be created is retrieved from the MOF file (step 1676). A menu item is created using the retrieved display name and the retrieved creation class (step 1680). The menu item is added to an array corresponding to the tree node for creatable items (step 1684). Processing loops back (loop 1686) to process the next creatable item. This looping continues until there are no more creatable items to process, at which time decision 1668 branches to "no" branch 1688. The create menu includes the creation of objects that are "weak" in the association, as well as all subclasses of that object.

A menu item is created for a "New" function that can be performed from the tree node (step 1690). The array of creatable items that was created (see step 1684) is attached to the "New" menu item (step 1692) so that a user can select "New" from a context menu corresponding to the tree node and select from the list of creatable items that appear after the "New" function is selected. The "New" menu item is attached to the tree menu array. In addition, an "Add" menu item is created for the tree menu (step 1696) along with a "Remove" menu item (step 1698) before processing ends at 1699.

Figure 17A:
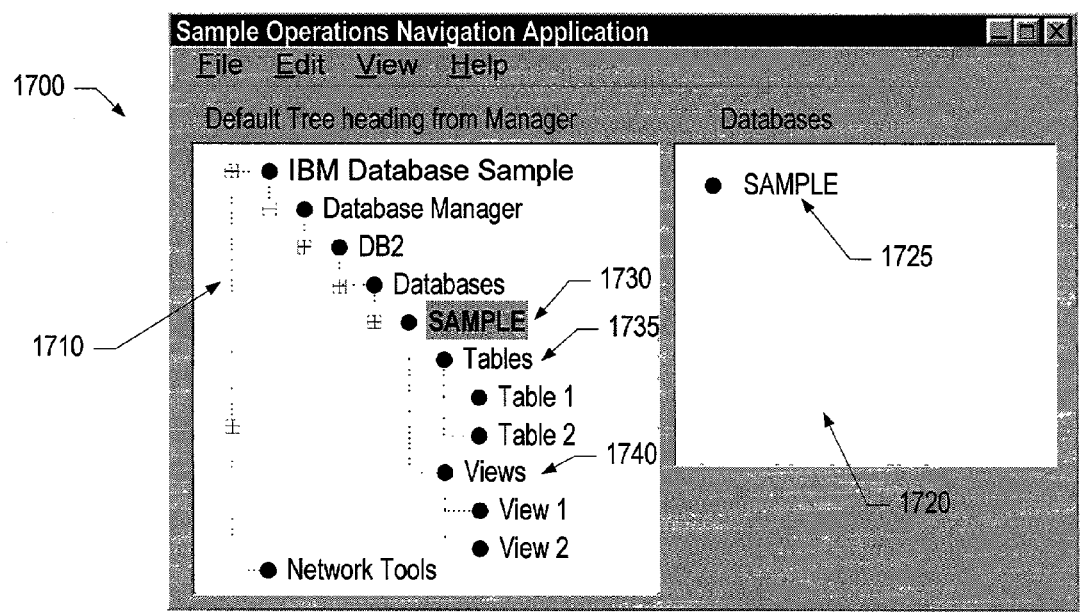
FIG. 17a is an example console interface created using information extracted from a management model.

FIG. 17*a* is an example console interface created using information extracted from a management model. Display screen 1700 includes a title bar, pull down menus, tree view control 1710, and object window 1720. Tree view control 1710 includes information extracted from a management data model, such as a MOF. In the example shown, menu item 1730 has been selected corresponding to the "SAMPLE" database. The available databases are also shown in object window 1720. Object window 1720 includes reference 1725 to the "SAMPLE" database.

Tree view 1710 shows various details regarding the products being administered by the console. For example, the selected SAMPLE database is shown to be an instance of "Databases" which is shown to be included in the "DB2" database product. "DB2" is in turn contained by "Database Manager" which could include other database managers, such as LDAP and IMS. The "Database Manager" is contained by the "IBM Database Sample."

Other nodes are shown to be contained by the SAMPLE database. For example, SAMPLE database 1730 includes database tables 1735 (table 1 and table 2). The SAMPLE database also includes database views 1740 (view 1 and view 2).

Figure 17B:
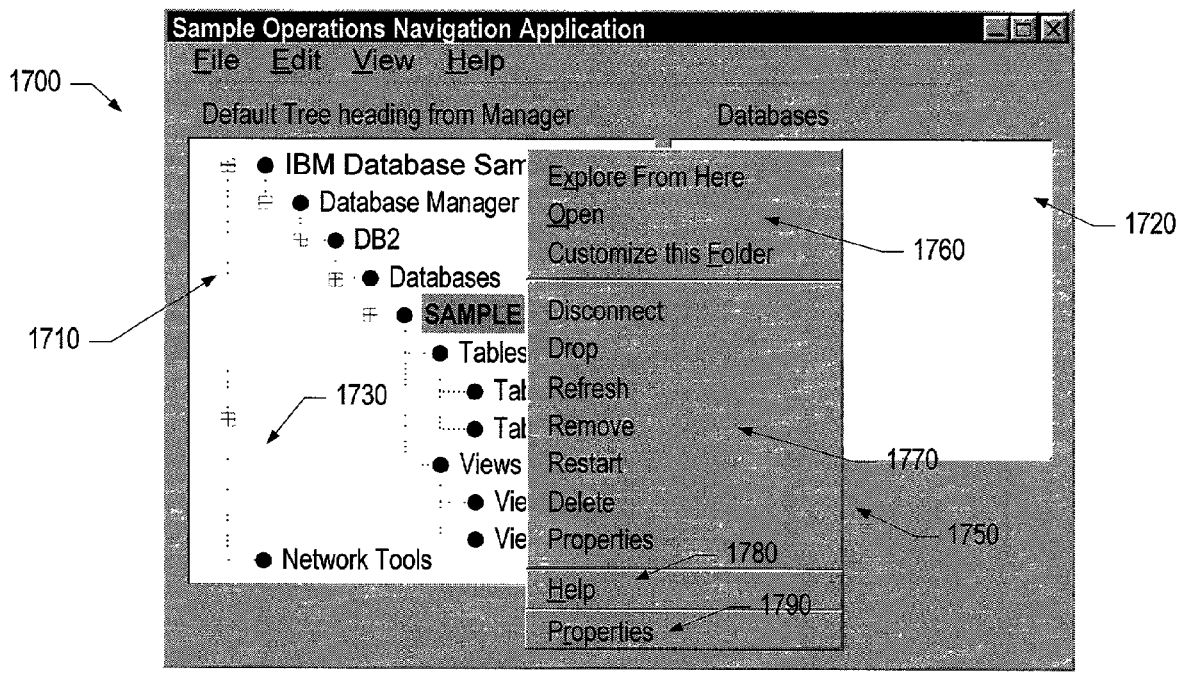
FIG. 17b is an example popup menu user interface created using information extracted from a management model.

The selection of menu item 1730 prompts the display of popup menu 1750 shown in FIG. 17*b*. Selection of menu item can be performed by a user clicking on the item with a mouse. Some systems use an alternative mouse click (i.e., a right button click) to display context sensitive popup menus. In addition, some systems allow a user to hold a mouse cursor over an item for a period of time whereupon the context menu is displayed. Furthermore, alternative selection means, such as with a keyboard, are also provided.

A variety of options to perform against the selected menu item are included in popup menu 1750. Some of these options are included with the particular console being used. For example, menu items 1760 includes console menu items that appear for nodes shown within the console. Other items are context specific, such as menu items 1770. Each of the context specific menu items can be performed against the selected "SAMPLE" database. The context menu items are therefore database specific. For example, if the user wishes to view the properties for the SAMPLE database he selects "Properties" menu item within menu item group 1770. Additional popup menu items may include "Help" menu item 1780 to display help (either specific to the selected database or more general help pertaining to the console), as well as "Properties" menu item 1790 that provides more general properties that pertain to the console, rather than properties that pertain to the selected SAMPLE database.

Figure 18:
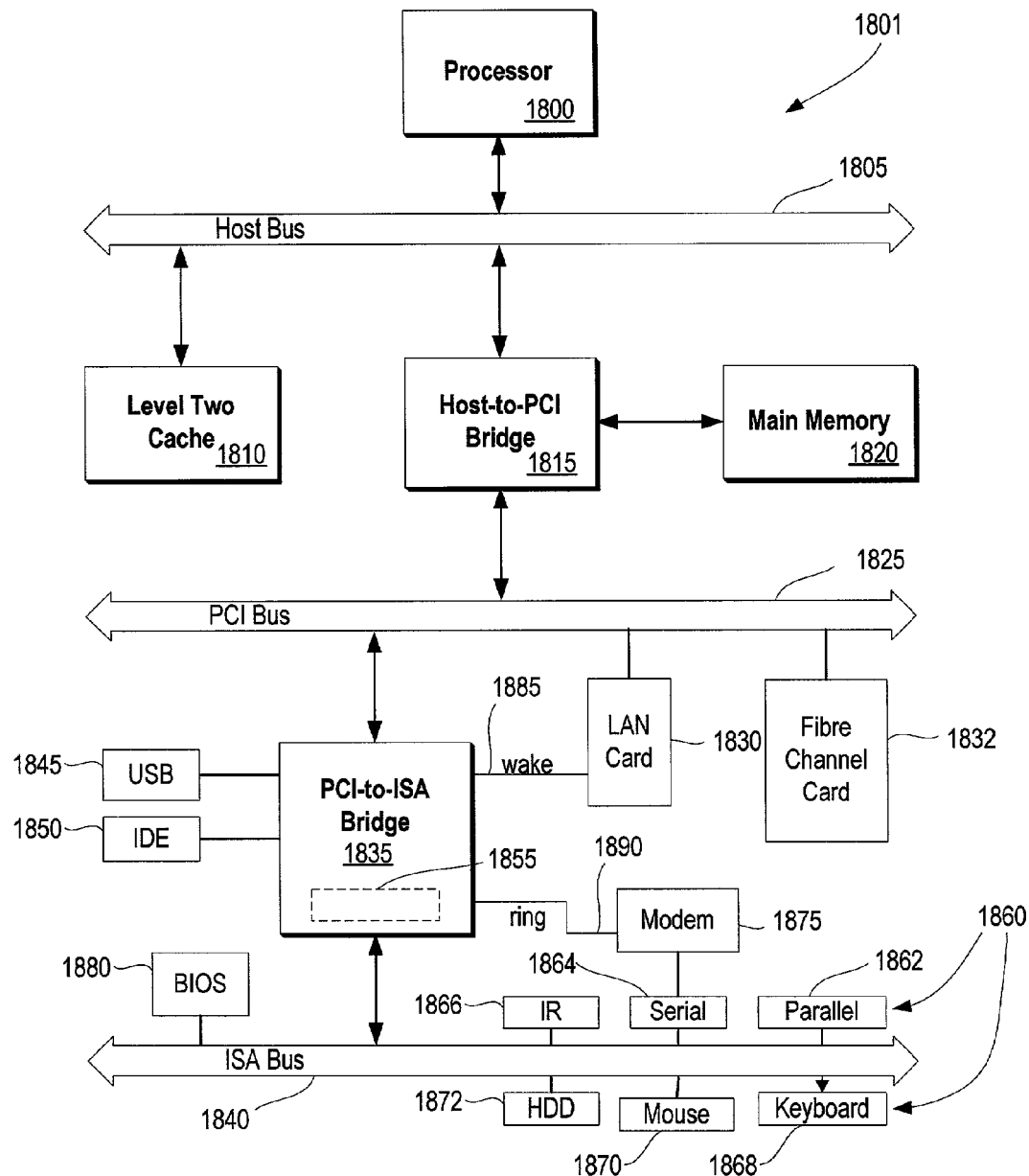
FIG. 18 is a block diagram of an information handling system capable of implementing the present invention.

FIG. 18 illustrates information handling system 1801 which is a simplified example of a computer system capable of performing the present invention. Computer system 1801 includes processor 1800 which is coupled to host bus 1805. A level two (L2) cache memory 1810 is also coupled to the host bus 1805. Host-to-PCI bridge 1815 is coupled to main memory 1820, includes cache memory and main memory control functions, and provides bus control to handle transfers among PCI bus 1825, processor 1800, L2 cache 1810, main memory 1820, and host bus 1805. PCI bus 1825 provides an interface for a variety of devices including, for example, LAN card 1830. PCI-to-ISA bridge 1835 provides bus control to handle transfers between PCI bus 1825 and ISA bus 1840, universal serial bus (USB) functionality 1845, IDE device functionality 1850, power management functionality 1855, and can include other functional elements not shown, such as a real-time clock (RTC), DMA control, interrupt support, and system management bus support. Peripheral devices and input/output (I/O) devices can be attached to various interfaces 1860 (e.g., parallel interface 1862, serial interface 1864, infrared (IR) interface 1866, keyboard interface 1868, mouse interface 1870, and fixed disk (FDD) 1872 coupled to ISA bus 1840. Alternatively, many I/O devices can be accommodated by a super I/O controller (not shown) attached to ISA bus 1840.

BIOS 1880 is coupled to ISA bus 1840, and incorporates the necessary processor executable code for a variety of low-level system functions and system boot functions. BIOS 1880 can be stored in any computer readable medium, including magnetic storage media, optical storage media, flash memory, random access memory, read only memory, and communications media conveying signals encoding the instructions (e.g., signals from a network). In order to attach computer system 1801 another computer system to copy files over a network, LAN card 1830 is coupled to PCI-to-ISA bridge 1835. Similarly, to connect computer system 1801 to an ISP to connect to the Internet using a telephone line connection, modem 1875 is connected to serial port 1864 and PCI-to-ISA Bridge 1835.

While the computer system described in FIG. 18 is capable of executing the invention described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of converting management models to one or more console interfaces, said method comprising:
   receiving a console selection corresponding to one of the console interfaces;
   identifying one or more console algorithms corresponding to the console selection;
   retrieving a generic management object from a management definition object that corresponds to at least one of the identified console algorithms;
   identifying one or more object classes and one or more object associations that include the object classes based on the retrieved generic management object;
   selecting one of the identified object classes;
   selecting one of the associations that include the selected object class, wherein the association includes a simple association;
   identifying one or more target classes corresponding to the selected association;
   locating one or more second association corresponding to the identified target class;
   determining a layout format based on the number of located second associations; and
   creating an extension file that includes the the layout format and that is adapted to perform the generic management object on the selected console interface.

2. The method as described in claim 1 wherein the management definition object includes a common information model managed object format file.

3. The method as described in claim 1 wherein the extension file includes a plug-in file adapted to interface with the selected console interface.

4. The method as described in claim 1 further comprising:
displaying the target class name in response to determining that there is one second association; and
displaying the association role in response to determining that there are more than one second associations.

5. The method as described in claim 1 further comprising:
retrieving user interface data from the management definition object; and
generating one or more graphical user interfaces using the retrieved user interface data.

6. The method as described in claim 1 further comprising:
retrieving user interface data from the management definition object;
converting the user interface data to one or more national languages;
storing the converted user interface data in one or more national language files;
selecting one of the national languages;
retrieving one of the national language files corresponding to the selected national language; and
generating one or more graphical user interfaces using the converted user interface data retrieved from the national language file.

7. The method as described in claim 1 further comprising:
creating a tree node displayable on a management console corresponding to the selected console interface;
creating a popup menu corresponding to the tree node, wherein the popup menu includes one or more menu selections; and
associating a method to each of the menu selections.

8. The method as described in claim 1 wherein the generic management object includes a display panel that displays information regarding a program product, wherein the management definition object is adapted to manage the program product.

9. An information handling system comprising:
one or more processors;
a memory accessible by the processors;
a nonvolatile storage area accessible by the processors; and
a conversion tool stored in the memory and executed by the processors for converting generic management data to specific console interfaces, the conversion tool including:
receiving logic for receiving a console selection corresponding to one of the console interfaces;
identification logic for identifying one or more console algorithms corresponding to the console selection;
retrieval logic for receiving a generic management object from a management definition object that corresponds to at least one or of the identified console algorithms;
identification logic for identifying one or more object classes and one or more object associations that include the object classes based on the retrieved generic management object;
selection logic for selecting one of the identified object classes;
selection logic for selecting one of the associations that include the selected object class, wherein the association includes a simple association;
identification logic for identifying one or more target classes corresponding to the selected association;
identification logic for locating one or more second associations corresponding to the identified target class;
layout determination logic for determining a layout format based on the number of located second associations; and
creation logic for creating an extension file that includes the layout format and that is adapted to perform the generic management object on the selected console interface.

10. The information handling system as described in claim 9 wherein the management definition object includes a common information model managed object format file.

11. The information handling system as described in claim 9 wherein the extension file includes a plug-in file adapted to interface with the selected console interface.

12. The information handling system as described in claim 9 further comprising:
display logic for displaying the target class name in response to determining that there is one second association and for displaying the association role in response to determining that there are more than one second associations.

13. The information handling system as described in claim 9 further comprising:
retrieval logic for retrieving user interface data from the management definition object; and
code generation logic for generating one or more graphical user interfaces using the retrieved user interface data.

14. The information handling system as described in claim 9 further comprising:
retrieval logic for retrieving user interface data from the management definition object;
conversion logic for converting the user interface data to one or more national languages;
storage logic for storing the converted user interface data in one or more national language files;
selection logic for selecting one of the national languages;
retrieval logic for retrieving one of the national language files corresponding to the selected national language; and
code generation logic for generating one or more graphical user interfaces using the converted user interface data retrieved from the national language file.

15. The information handling system as described in claim 9 further comprising:
display logic for displaying a tree node on a management console corresponding to the selected console interface; and
display logic for displaying a popup menu corresponding to the tree node, wherein the popup menu includes one or more menu selections, and wherein each menu selection includes an associated method.

16. The information handling system as described in claim 9 wherein the generic management object includes a display panel that displays information regarding a program product, wherein the management definition object is adapted to manage the program product.

17. A computer program product stored in a computer readable medium that includes computer instructions that, when executed by a data processing system, causes the data processing system to perform actions that include:
receiving a console selection corresponding to one of the console interfaces;
identifying one or more console algorithms corresponding to the console selection;
retrieving a generic management object from a management definition object that corresponds to at least one of the identified console algorithms;
identifying one or more object classes and one or more object associations that include the object classes based on the retrieved generic management object;

selecting one of the identified object classes;
selecting one of the associations that include the selected object class, wherein the association includes a simple association;
identifying one or more target classes corresponding to the selected association;
locating one or more second associations corresponding to the identified target class;
determining a layout format based on the number of located second associations; and
creating an extension file that includes the layout format and that is adapted to perform the generic management object on the selected console interface.

18. The computer program product as described in claim 17 wherein the management definition object includes a common information model managed object format file.

19. The computer program product as described in claim 17 wherein the extension file includes a plug-in file adapted to interface with the selected console interface.

20. The computer program product as described in claim 17 further comprising computer instructions that perform actions that include:
displaying the target class name in response to determining that there is one second association; and
displaying the association role in response to determining that there are more than one second associations.

21. The computer program product as described in claim 17 further comprising computer instructions that perform actions that include:
retrieving user interface data from the management definition object; and
generating one or more graphical user interfaces using the retrieved user interface data.

22. The computer program product as described in claim 17 further comprising computer instructions that perform actions that include:
retrieving user interface data from the management definition object;
converting the user interface data to one or more national languages;
storing the converted user interface data in one or more national language files;
selecting one of the national languages;
retrieving one of the national language files corresponding to the selected national language; and
generating one or more graphical user interfaces using the converted user interface data retrieved from the national language file.

23. The computer program product as described in claim 17 further comprising computer instructions that perform actions that include:
creating a tree node displayable on a management console corresponding to the selected console interface;
creating a popup menu corresponding to the tree node, wherein the popup menu includes one or more menu selections; and
associating a method to each of the menu selections.

24. The computer program product as described in claim 17 wherein the generic management object includes a display panel that displays information regarding a program product, wherein the management definition object is adapted to manage the program product.

25. A method of converting management models to one or more console interfaces, said method comprising:
receiving a console selection corresponding to one of the console interfaces;
identifying one or more console algorithms corresponding to the console selection;
retrieving a generic management object from a management definition object that corresponds to at least one of the identified console algorithms;
creating an extension file adapted to perform the generic management object on the selected console interface, the extension file including a layout format;
identifying one or more object classes and one or more object associations that include the object classes based on the retrieved generic management object;
selecting one of the identified object classes;
selecting one of the associations that include the object class, wherein the association includes a simple association;
identifying one or more target classes corresponding to the selected association;
locating one or more second associations corresponding to the identified target class; and
determining the layout format based on the number of located second associations.

26. A method of converting management models to one or more console interfaces, said method comprising:
receiving a console selection corresponding to one of the console interfaces;
identifying one or more console algorithms corresponding to the console selection;
retrieving a generic management object from a management definition object that corresponds to at least one of the identified console algorithms;
creating an extension file adapted to perform the generic management object on the selected console interface, the extension file including one or more graphical user interfaces;
retrieving user interface data from the management definition object;
converting the user interface data to one or more national languages, wherein the national languages are specified in one or more classes included in the management definition object;
storing the converted user interface data in one or more national language files;
selecting one of the national languages;
retrieving one of the national language files corresponding to the selected national language; and
generating one or more of the graphical user interfaces using the converted user interface data retrieved from the national language file.

27. An information handling system comprising:
one or more processors;
a memory accessible by the processors;
a nonvolatile storage area accessible by the processors; and
a conversion tool stored in the memory and executed by the processors for converting generic management data to specific console interfaces, the conversion tool including:
receiving logic for receiving a console selection corresponding to one of the console interfaces;
identification logic for identifying one or more console algorithms corresponding to the console selection;
retrieval logic for receiving a generic management object from a management definition object that corresponds to at least one of the identified console algorithms;

creation logic for creating an extension file adapted to perform the generic management object on the selected console interface, the extension file including a layout format;

identification logic for identifying one or more object classes and one or more object associations that include the object classes based on the retrieved generic management object;

selection logic for selecting one of the identified object classes and for selecting one of the associations that include the object class, wherein the association includes a simple association;

identification logic for identifying one or more target classes corresponding to the selected association;

location logic for locating one or more second associations corresponding to the identified target class;

determination logic for determining the layout format based on the number of located second associations; and display logic for displaying the target class name in the layout format in response to determining that there is one second association and for displaying the association role in response to determining that there are more than one second associations.

28. A computer program product stored in a computer readable medium that includes computer instructions that, when executed by a data processing system, causes the data processing system to perform actions that include:

receiving a console selection corresponding to one of the console interfaces;

identifying one or more console algorithms corresponding to the console selection;

retrieving a generic management object from a management definition object that corresponds to at least one of the identified console algorithms;

creating an extension file adapted to perform the generic management object on the selected console interface, the extension file including a layout format;

identifying one or more object classes and one or more object associations that include the object classes based on the retrieved generic management object;

selecting one of the object classes;

selecting one of the identified associations that include the object class, wherein the association includes a simple association;

identifying one or more target classes corresponding to the selected association;

locating one or more second associations corresponding to the identified target class;

determining a layout format based on the number of located second associations;

displaying the target class name in the layout format in response to determining that there is one second association; and displaying the association role in the layout format in response to determining that there are more than one second associations.

* * * * *